United States Patent

Komai et al.

[11] Patent Number: 5,555,142
[45] Date of Patent: Sep. 10, 1996

[54] MAGNETIC DISK SYSTEM

[75] Inventors: Tomoko Komai, Kawasaki; Makoto Imamura, Kanagawa-ken; Yuji Sakai; Tetsuo Inoue, both of Yokohama, all of Japan

[73] Assignee: Kabushiki Kaisha Toshiba, Kawasaki, Japan

[21] Appl. No.: 217,867

[22] Filed: Mar. 25, 1994

Related U.S. Application Data

[63] Continuation-in-part of Ser. No. 766,326, Sep. 27, 1991, Pat. No. 5,331,492.

[30] Foreign Application Priority Data

| Sep. 27, 1990 | [JP] | Japan | 2-255115 |
| Oct. 29, 1990 | [JP] | Japan | 2-288352 |
| Jan. 31, 1991 | [JP] | Japan | 3-011108 |

[51] Int. Cl.$^6$ .................................... G11B 5/596
[52] U.S. Cl. ......................... 360/77.06; 360/113
[58] Field of Search ..................... 360/77.06, 77.12, 360/113, 77.04

[56] References Cited

U.S. PATENT DOCUMENTS

| 4,012,781 | 3/1977 | Lin . | |
| 4,040,113 | 8/1977 | Gorter | 360/113 |
| 4,633,344 | 12/1986 | Jeffers | 360/77.12 |
| 4,647,992 | 3/1987 | Vinal | 360/113 |
| 5,079,663 | 1/1992 | Ju et al. | 360/77.06 X |
| 5,331,492 | 7/1994 | Komai et al. | 360/113 |

*Primary Examiner*—Aristotelis Psitos
*Assistant Examiner*—James L. Habermehl
*Attorney, Agent, or Firm*—Oblon, Spivak, McClelland, Maier & Neustadt, P.C.

[57] ABSTRACT

A magnetic disk system comprises a magnetic head for writing data on and reading data from a magnetic disk as a recording medium and a magnetic disk unit having a head positioning mechanism for positioning the magnetic head on a selected track of the magnetic disk without forming servo information on the magnetic disk. The magnetic head comprises an MR film which is disposed parallel to the direction of the width of a track of the magnetic disk, current supplying electrodes disposed to be in contact with both ends of the magnetic film which are opposed in the direction of the track width and a signal detecting electrode disposed between the current supplying electrodes to be in contact with the MR film. The width of the signal detecting electrode is less than ⅓ of that of the current supplying electrodes. The magnetic disk system permits highly accurate alignment of the magnetic head with closely spaced tracks.

14 Claims, 24 Drawing Sheets

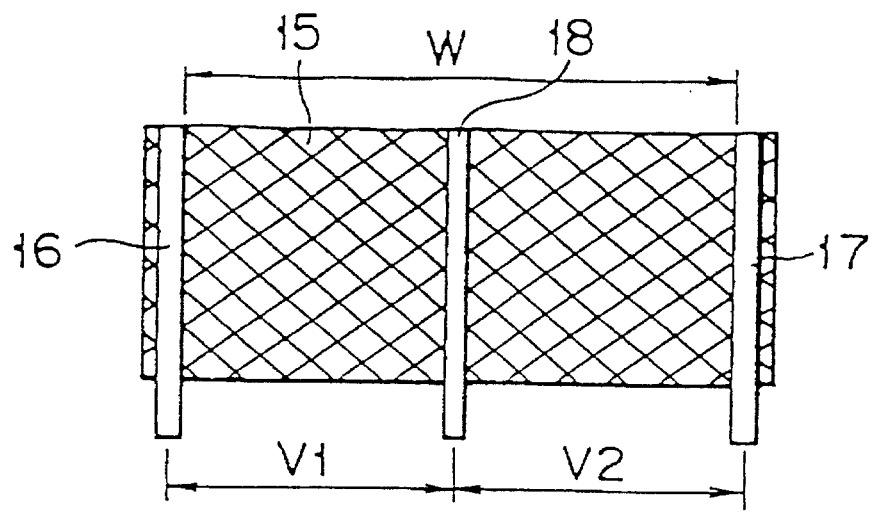
F I G. 2A
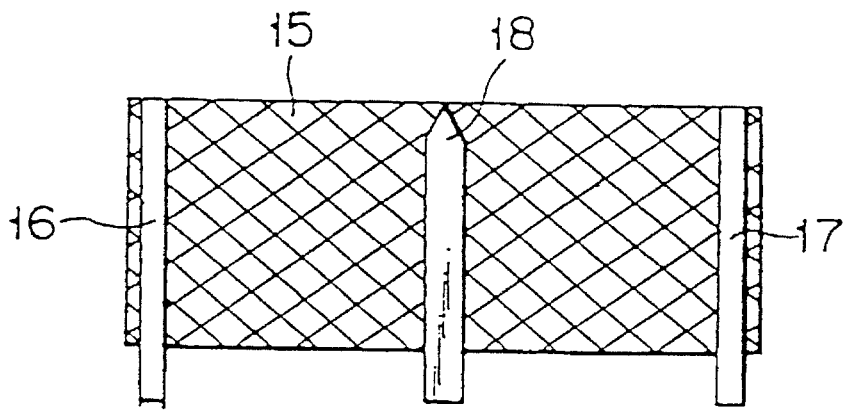
F I G. 2B

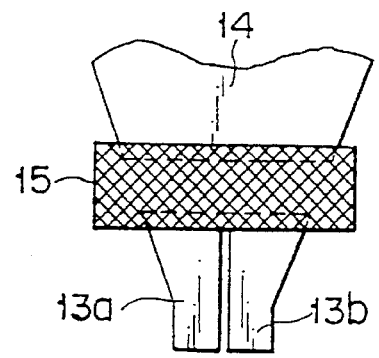
F I G. 9
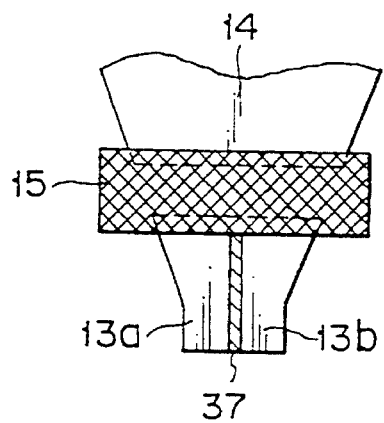
F I G. 10
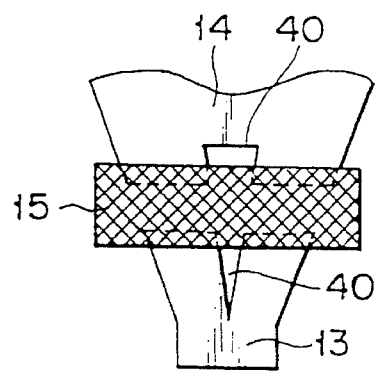
F I G. 11

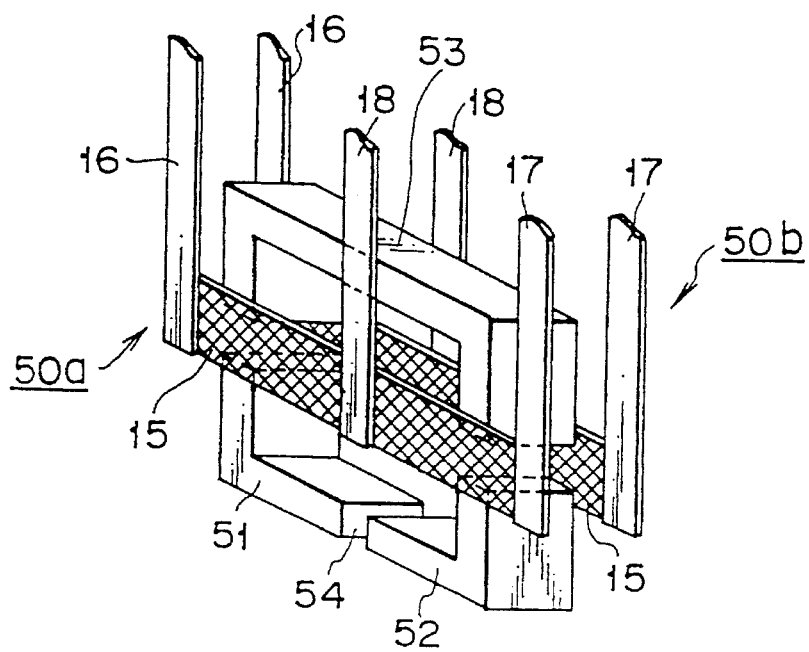
F I G. 15
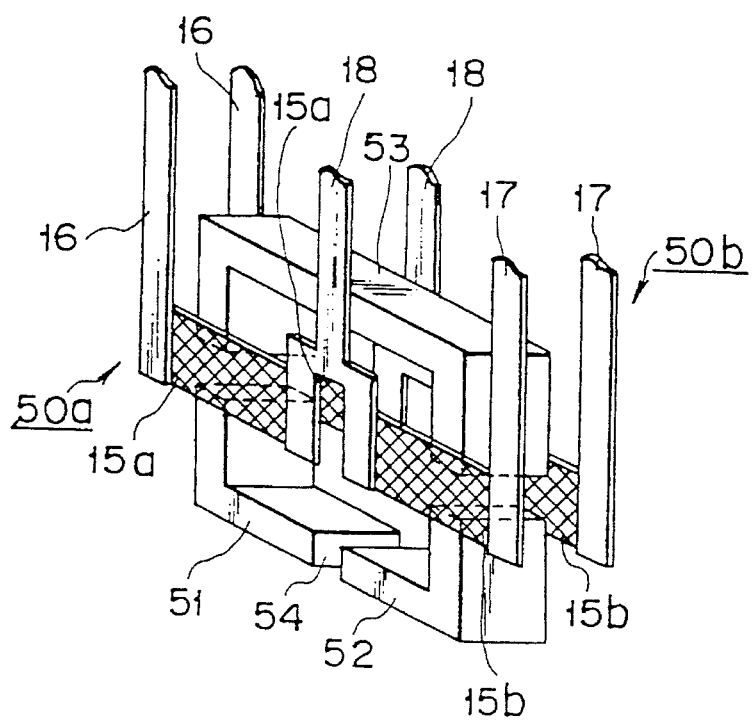
F I G. 16

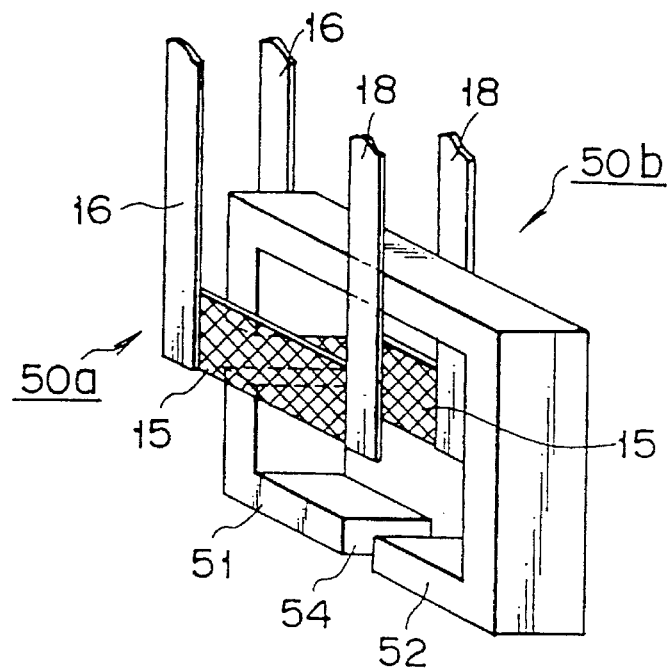
F I G. 17
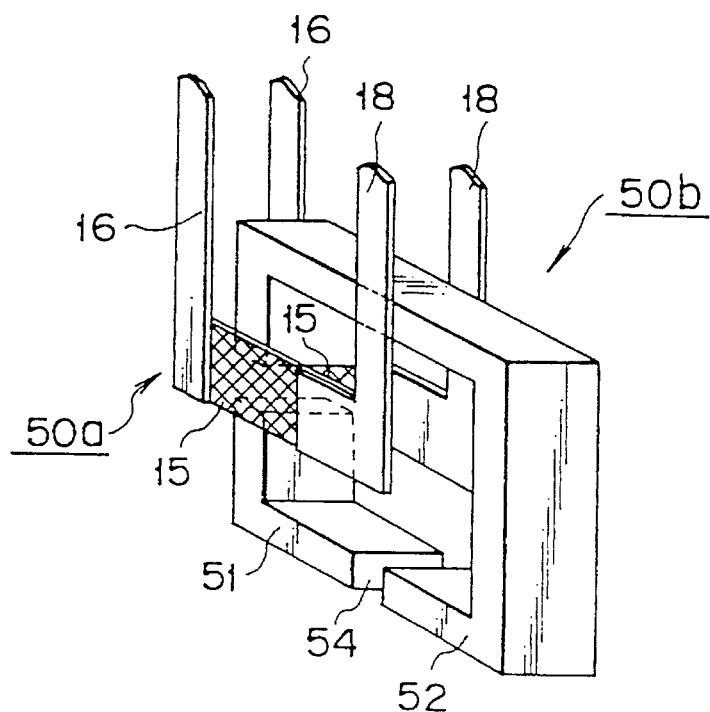
F I G. 18

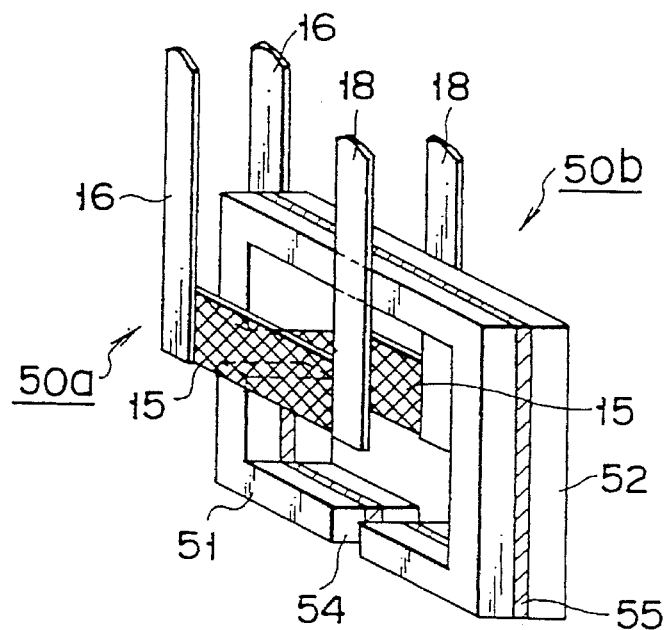
F I G. 21
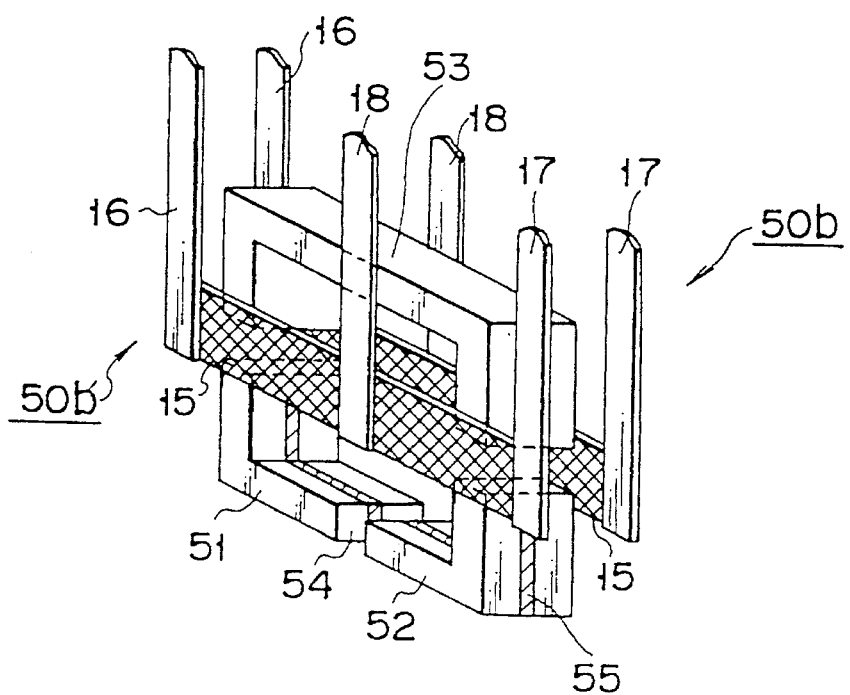
F I G. 22

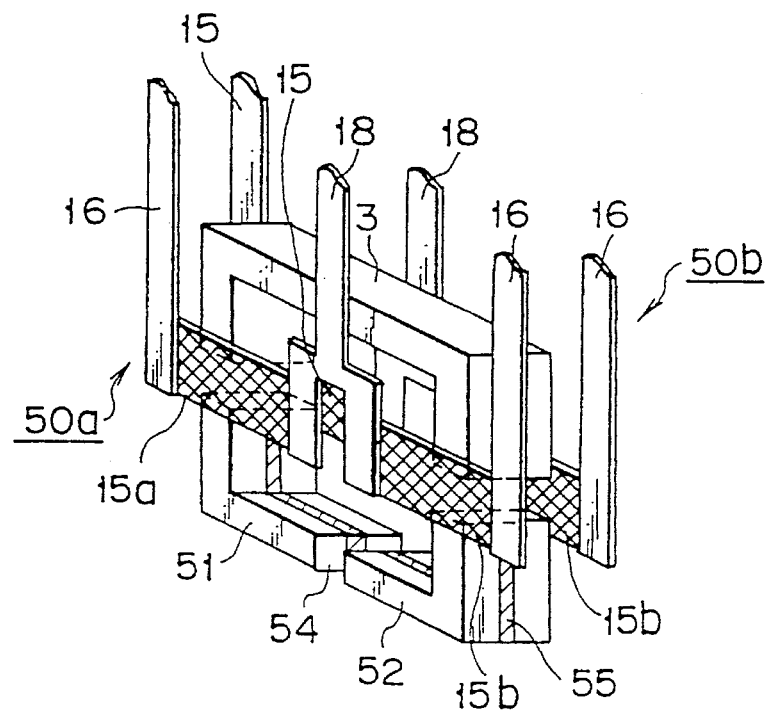
F I G. 23
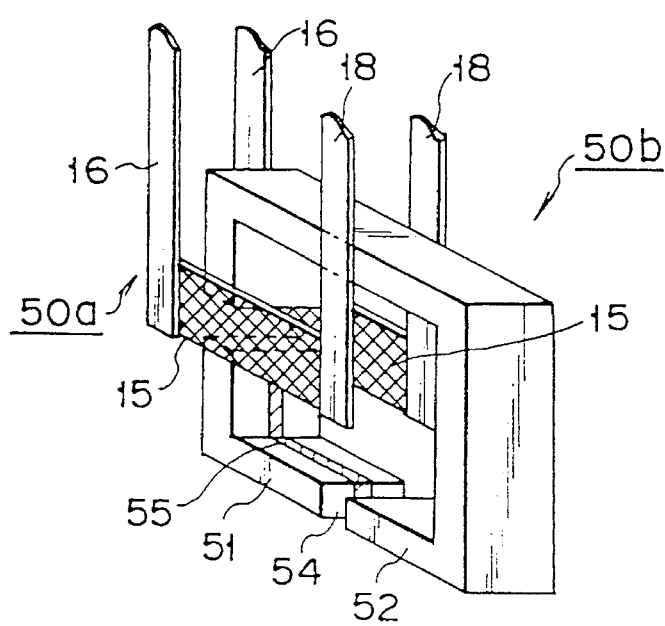
F I G. 24

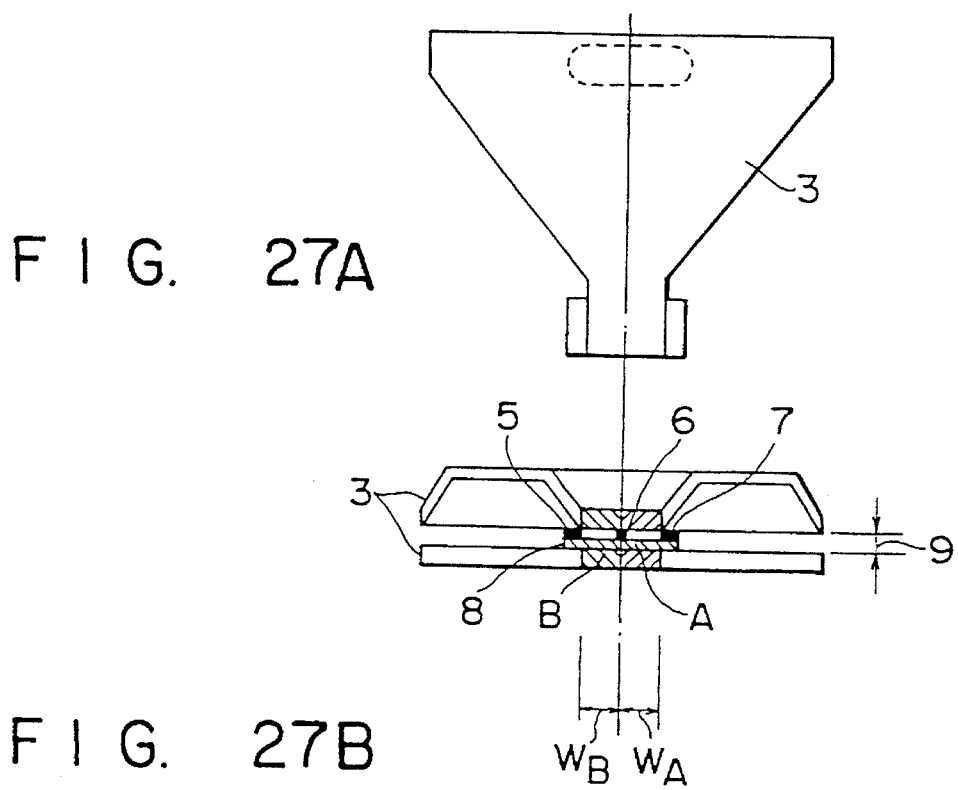
F I G. 27A
F I G. 27B
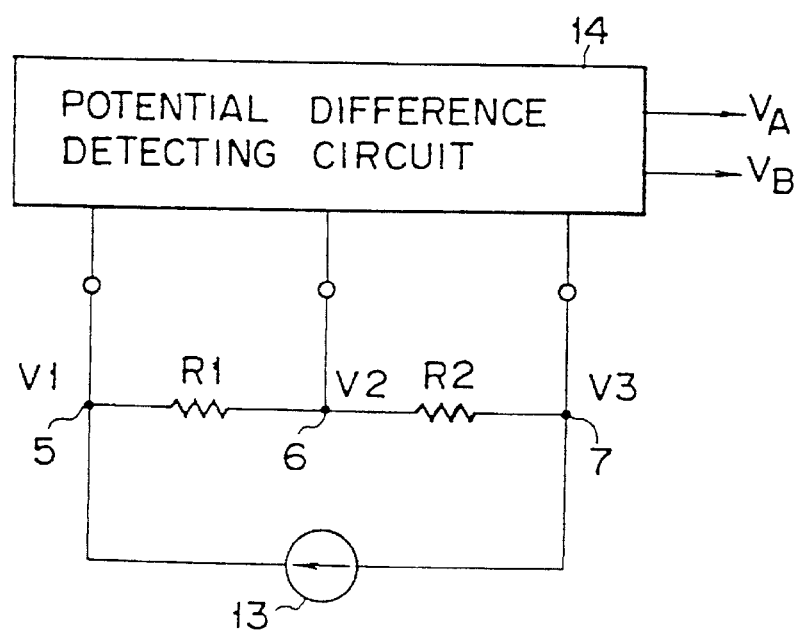
F I G. 28

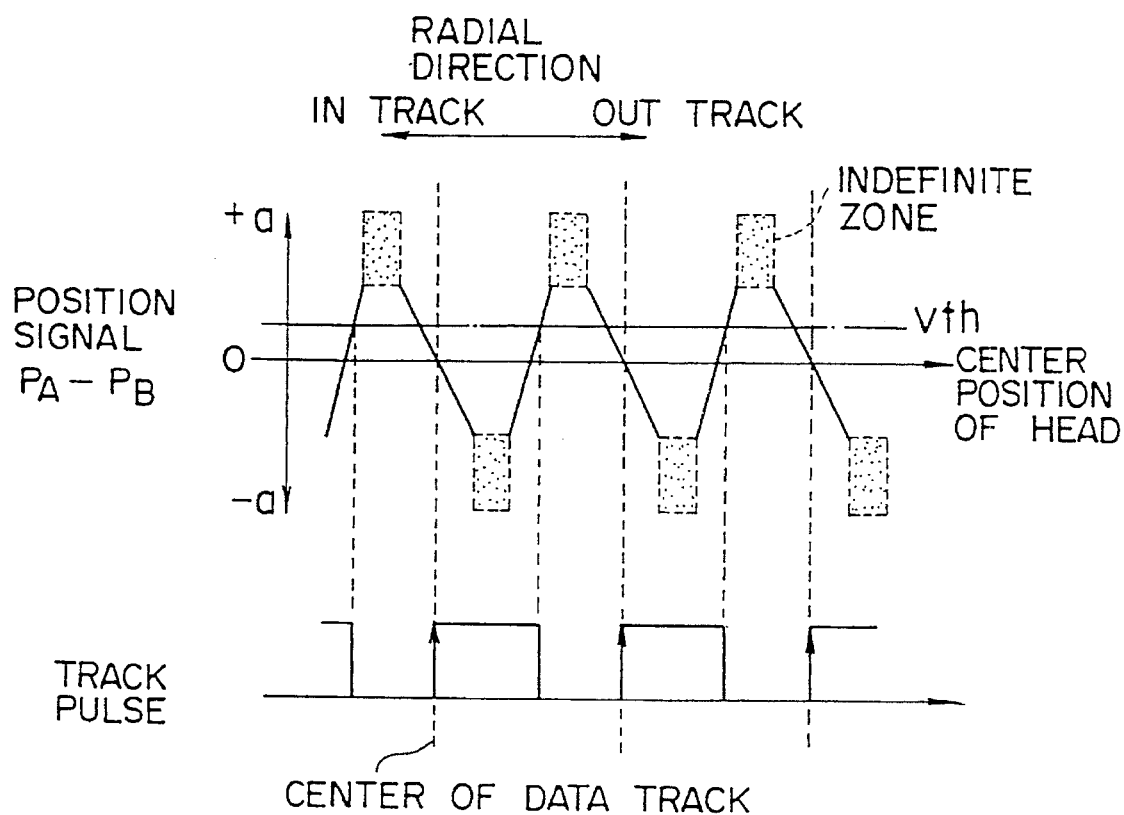
F I G. 34
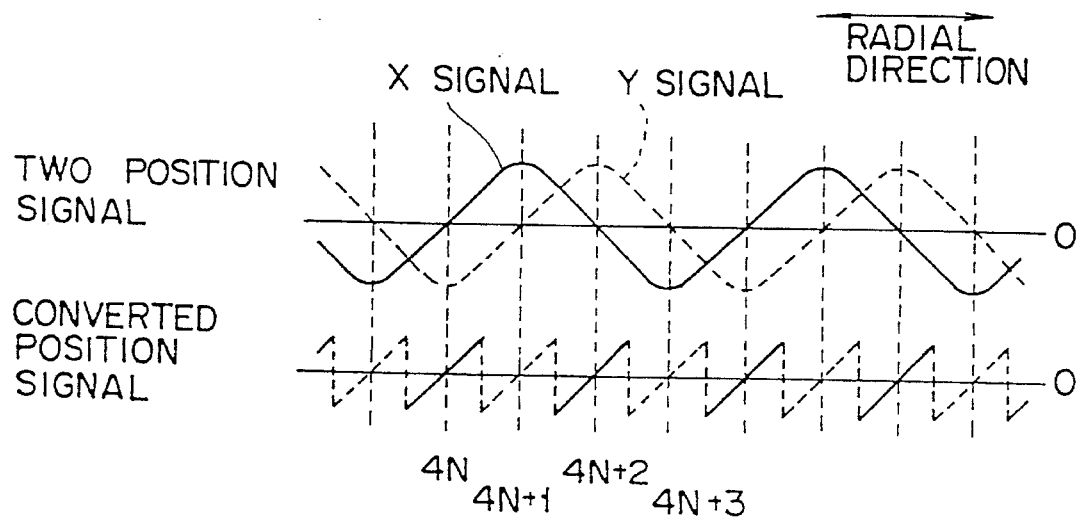
F I G. 35

5,555,142

MAGNETIC DISK SYSTEM

CROSS-REFERENCES TO THE RELATED APPLICATIONS

This application is a continuation-in-part of U.S. patent application Ser. No. 07/766,326 filed on Sep. 27, 1991, now U.S. Pat. No. 5,331,492.

BACKGROUND OF THE INVENTION

1. Field of the Invention

The present invention relates to a magnetic disk system constructed from a magnetic head assembly and a magnetic disk unit, and more particularly to a magnetic disk system having a magnetic disk unit which has a feature which permits at least one magnetic head to be positioned on a selected data track accurately without the necessity of forming servo information on the disk and a magnetic head assembly which is suitable for its alignment with a track (i.e. tracking) and its azimuth alignment.

2. Description of the Related Art

In general, with a magnetic disk unit, it is required to accurately position a magnetic head on data tracks of a magnetic disk at the time of reading of information from or writing of information on the disk. Heretofore, tracking servo systems for positioning a head on tracks include the following systems.

(1) The servo-surface servo system which uses a dedicated servo surface.

(2) The data-surface servo system which uses servo information recorded on a data surface.

(3) The servo-surface and data-surface combined system which uses both a servo surface and a data surface in combination.

In the first place, with the servo-surface servo system, servo information is formed over the whole of a certain surface (e.g. servo surface) of more than one disk surface and the servo information is continuously read to permit a servo head on the servo surface to track servo tracks correctly. A data head, which is mounted on the same carriage as the servo head and makes access to another disk surface (e.g. data surface), interlocks the head on the servo surface to make access to a data track corresponding to a servo track. With the servo-surface servo system, when expansion and contraction of the disks occur due to variations in temperature and humidity, a problem arises in that the head will go off a data track (i.e. thermal off-truck) depending on a difference in expansion and contraction between disk surfaces. In addition, the servo-surface servo system uses the whole of a surface of a disk as the servo surface and thus formatting efficiency will be decreased particularly when the number of disks is small.

With the sector servo system which is a type of the data surface servo system, servo information is formed on a part of sectors, i.e., a servo sector. The so-called sampled value control system for tracking is used which permits the servo information to be read by the head which makes access to a data surface for reading or writing. With the sector servo system, since the servo information is demodulated for each of the data surfaces to position a corresponding head on a selected track, such thermal off-track as described above will never occur. According to the method, the tracking servo is performed by the sample value control because the servo information is read intermittently for each of servo sectors. Compared with the above-described servo-surface servo system in which servo signals are continuously obtained, therefore, a wide servo band cannot be achieved. The trackability will be poor if it is assumed that there is no thermal off-track. In the sector servo system, the settling-time is longer and the disturbance-proof performance is also poorer.

with the servo surface and data surface combined system, on the other hand, the servo information is formed on each data surface with the servo head positioned on a servo track on the servo surface, whereas in the servo-surface servo system, data is read from or written on a data surface by the data head with the servo head positioned on a track on the servo surface. The servo information is formed on a part of servo sectors, i.e., the servo sector. From the servo information formed in the servo sector on the data surface is obtained a position signal (information indicating the position of the head relative to a track) which is in a low frequency range and contains a DC (Direct Current) component which is used to perform tracking control. In the combined system as well, the format efficiency is poor and the circuitry used is complex in construction. Because there is the necessity of servo formatting as well as data formatting, a problem will arise in that it takes a long time to establish and implement the system.

The demand for higher recording density in magnetic recording/reproducing apparatus such as magnetic disk units has been increasing recently. For a higher recording density, the track density and linear density must be increased. Narrowing the width of tracks will also be required. As a magnetic recording medium used has been made of not only a longitudinal recording medium on which information is recorded using the usual recording method but also a perpendicular recording medium and an obliquely evaporated/sputtered recording medium. Under such conditions, it has been required that the registration of a read/write head with tracks on a magnetic recording medium and the azimuth alignment be performed more precisely. In order to detect track offset and azimuth offset necessary for the registration and azimuth alignment of a head, a specific type of magnetic head has been used.

FIG. 36 illustrates an example of a conventional magnetic head which uses two induction type heads to detect track offset. That is, magnetic cores 101 and 102 consisting of a soft magnetic material are disposed side by side in the direction of the width (indicated by W) of a track and coils 103 and 104 are wound around the magnetic cores 101 and 102, respectively. Supposing outputs of the induction type heads to be V1 and V2, respectively, when the head positions right over the track, the following equation will hold.

$$V1-V2=0$$

When the head does not position right over the track, the following relationship will hold.

$$V1-V2=0$$

Thus, the track offset is detected from the difference magnitude between V1 and V2 and the azimuth can be detected from the difference in phase between V1 and V2.

With the arrangement of FIG. 36 in which two inductive-type heads each having a magnetic core wound with a coil are disposed side by side, however, a space must be secured to permit the coils to be wound around the cores and the dimension of the heads in the direction of width of a track must be made large. Thus, the conventional head shown in FIG. 36 will have a structure which is not suited to narrow the tracks of a disk.

As a magnetic head which needs no coil, on the other hand, there is an MR head which uses Magnetoresistance (MR) film having the magnetoresistance effect. FIG. 37 illustrates which is referred to as a yoke type MR head which uses a yoke (i.e., magnetic core) to conduct leakage flux from a magnetic recording medium to an MR film. The MR head is constructed from a lower core 201, separated upper cores 203 and 204 disposed above the lower core with a read/write gap 202 disposed therebetween, an MR film 205 disposed between the upper cores 203 and 204 and electrodes 206 and 207 connected to the both ends of the MR film 205.

FIGS. 38A and 38B illustrate conventional shield type MR heads having a shielding function by an MR film. As shown in FIG. 38A, between that ends of magnetic cores 208 and 209 which form a recording/reproducing gap are disposed tips of an MR film 205 and electrodes 208 and 209. In FIG. 38B, between a magnetic core 208 disposed below a magnetic core 209 and a newly provided shielding plate 200 are disposed an MR film 205 and electrodes 206 and 207. In the case of FIG. 38B, a recording gap is formed between ends of the magnetic cores 208 and 209, while a reproducing gap is formed between the magnetic core 208 and the shield plate 200.

Of the conventional tracking servo systems for placing a head on tracks, the servo-surface servo system using a dedicated servo surface has the off-track problem (a) in which the head cannot be placed on a selected track correctly depending on a difference in expansion and contraction between disk surfaces which is due to variations in temperature and humidity, and the poor formatting efficiency problem (b) arising from the fact that the whole of a surface of a disk is used as a servo surface only.

Of the data-surface servo systems, the sector servo system in particular has not the off-track problem but problems (c) in that not only the trackability is poor because the servo band cannot be made high by the use of the sampled value control system but also the settling-time is longer and the disturbance-proof performance is poorer.

The servo-surface and data-surface combined system is poor in format efficiency and complex in circuit arrangement. Moreover, the problem (d) arises in that it takes a long time to establish and implement the system because servo formatting must be performed on a data surface in addition to data formatting.

In the conventional magnetic head assembly, as described above, two inductive-type heads are disposed adjacent to each other in the direction of the width of a track in order to detect track offset and azimuth offset. With the magnetic head assembly of such a structure, however, the problem (e) arises in that its structure becomes unsuitable for narrowing tracks because its dimension along the width of a track has to be made large because of the necessity of securing a space for winding coils.

SUMMARY OF THE INVENTION

The present invention is directed to the provision of a magnetic disk system which has a magnetic head and a magnetic disk unit which permit various problems (a) to (e) associated with the conventional tracking servo systems to be solved.

It is therefore a first object of the present invention to provide a magnetic disk system having a magnetic disk unit which permits the correct placement of a head on data tracks by obtaining a position signal indicating the position of the head relative to data tracks from data tracks of each disk surface without the necessity of recording any tracking servo information.

It is a second object of the present invention to provide a magnetic disk system having a magnetic head assembly which permits high-sensitivity detection of track offset and azimuth offset even when the conventional problems are solved and narrowing of disk tracks is realized.

As a magnetic head for use in a magnetic disk system of the present invention, a composite head assembly is used which comprises at least one recording head for recording data on data tracks of a magnetic disk and at least two reproducing heads disposed parallel to the direction of a radial line of the magnetic disk for obtaining reproduced outputs independently, the recording head and the reproducing heads being formed integral with each other. The difference between the reproduced outputs of the reproducing heads or the difference between the reproduced outputs which have been subjected to peak detection or synchronous detection is obtained to produce a position signal indicating the relative position of the magnetic head assembly with respect to a data track. By the use of the position signal the magnetic head assembly is controlled so that it is positioned on a selected track.

In the present invention, a prescribed formatting signal is recorded on data tracks by the recording head while displacement of the magnetic head assembly is detected from the outside of the magnetic disk. When data is recorded on data tracks, the position signal is used to position the magnetic head on a selected track in an area other than a data recording area on the track. In the data recording area, on the other hand, a position signal, which has been obtained immediately before the initiation of data recording and held since then, is used to position the magnetic head on a selected data track.

When a formatting signal is recorded on an unrecorded magnetic disk, displacement of the magnetic head assembly along a radial line of the disk is detected from the outside of the disk. The head positioning control is performed at a predetermined track pitch on the basis of the amount of displacement of the head assembly so as to record the formatting signal over the whole surface of the disk. When data is reproduced from a recorded track, the tracking control of the head is performed using a position signal produced as described above.

In the seek control from a track to another track, the current position of the head can be detected by detecting the number of tracks that the head crossed on the basis of the position signal obtained from the reproduced outputs of the reproducing heads, which may be subjected to signal processing. At the same time, feedback speed control is performed on a desired speed curve which is a control index up to a selected track using speed information obtained by detecting the displacement of the magnetic head from the outside of the disk.

A magnetic head according to a first aspect comprises a magnetic film (e.g., an MR film) disposed substantially parallel to the direction of the width of a track of a magnetic recording medium and having the magnetoresistance effect, at least one pair of current supply electrodes disposed to be in contact with both ends or their neighborhoods of the magnetic film in the direction of the width of a track and at least one signal detect electrode disposed between the current supply electrodes to be in contact with the magnetic film, the signal detect electrode being smaller in width than the current supply electrodes. It is desirable that the width of the signal detect electrode be below ⅓ of that of the current supply electrodes.

The magnetic head may further comprises a magnetic core (e.g., a yoke) for conducting leakage flux from the magnetic recording medium to the magnetic film. It is desirable that that part of the magnetic core which is nearer to the magnetic recording medium be magnetically divided into sections (e.g., two sections).

A magnetic head according to a second aspect comprises first and second magnetic detecting elements (including MR films). Each of the first and second magnetic detecting elements comprises a magnetic film disposed substantially parallel to the direction of the length of a track of a magnetic recording medium and having the magnetoresistance effect and at least one pair of electrodes disposed to be in contact with both ends or their neighborhoods of the magnetic film which are opposed in the direction of the length of the track. Between the first and second magnetic detecting elements is disposed a magnetic core for conducting leakage flux from the recording medium to the magnetic films of the first and second magnetic detecting elements. It is desirable that that part of the magnetic core which is nearer to the magnetic recording medium be magnetically divided in the direction of the track width.

In the magnetic disk unit of the present invention, the position signal required to position the head on a selected track is obtained from reproduced outputs of the reproducing heads as described above. Thus, the following advantages will be obtained.

(1) There is no need of recording head positioning servo information on a magnetic disk. The formatting efficiency improves.

(2) The thermal off-track problem due to expansion and contraction of a disk will be resolved because the position signal is continuously obtained from signals on data tracks.

(3) The servo band becomes wide, so that the trackability, settling characteristics and disturbance resisting characteristics improve. This permits accurate positioning of the head on a data track.

(4) There is no need for both the data formatting and servo formatting. Thus, the time it takes to establish and implement the system is shortened.

The magnetic head according to the first aspect has the following advantages.

(5) By disposing the magnetic film (e.g., the MR film) having the magnetoresistance effect in the direction of the track width, producing a constant current flow in the MR film through the current supply electrodes and detecting a voltage difference corresponding to the amount of track offset or azimuth offset through the signal detect electrodes, the necessity of adjoining two heads in the direction of a track can be eliminated and the size of the head in the direction of the track width can be made small.

(6) By making the signal detect electrode smaller in width than the current supply electrodes, the area of a portion which is adapted to detect leakage flux from the magnetic recording medium can be made large. Thus, even if the data tracks are made narrower, the track offset and azimuth offset can be detected with a high sensitivity.

(7) By magnetically dividing that portion of the magnetic core which is nearer to the magnetic recording medium in the direction of the track width, leakage flux from each of the right and left portions of a track is conducted to a corresponding respective MR film. Thus, the track offset and azimuth offset can be detected with a higher sensitivity.

Moreover, with the magnetic head according to the second aspect, first and second magnetic detecting elements, each of which comprises an MR film disposed substantially parallel to the direction of the length of a track and at least one pair of electrodes disposed to be in contact with the MR film, are disposed apart from each other in the direction of the track width. The first and second magnetic detecting elements detects a voltage difference or a current difference corresponding to the amount of track offset or azimuth offset. Thus, the head has the following advantages.

(8) The necessity of winding a coil around each magnetic detecting element as in an induction head is eliminated. The size of the entire head in the direction of the track width can be made small.

(9) The MR film is disposed substantially parallel to the direction of the length of a track and there is no limit to the size in this direction. Thus, the area of a portion which is adapted to detect leakage flux emerging from the magnetic recording medium can be made large. In the case of a disk with closely spaced tracks, therefore, the track offset and azimuth offset can be detected with a high sensitivity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a plan view of the essential part of the magnetic head assembly of FIG. 1:

FIG. 2B is a plan view of the essential part of a magnetic head assembly which is a modification of the magnetic head of FIG. 1;

FIG. 9 is a plan view of the essential part of a seventh embodiment of the magnetic assembly head which is used in the magnetic disk system of the present invention;

FIG. 10 is a plan view of the essential part of a seventh embodiment of the magnetic head assembly which is used in the magnetic disk system of the present invention;

FIG. 11 is a plan view of the essential part of a ninth embodiment of the magnetic head assembly which is used in the magnetic disk system of the present invention;

FIG. 15 is a plan view of the essential part of a thirteenth embodiment of the magnetic head assembly which is used in the magnetic disk system of the present invention;

FIG. 16 is a plan view of the essential part of a fourteenth embodiment of the magnetic head assembly which is used in the magnetic disk system of the present invention;

FIG. 17 is a plan view of the essential part of a fifteenth embodiment of the magnetic head assembly which is used in the magnetic disk system of the present invention;

FIG. 18 is a plan view of the essential part of a sixteenth embodiment of the magnetic head assembly which is used in the magnetic disk system of the present invention;

FIG. 21 is a plan view of the essential part of a nineteenth embodiment of the magnetic head assembly which is used in the magnetic disk system of the present invention;

FIG. 22 is a plan view of the essential part of a twentieth embodiment of the magnetic head assembly which is used in the magnetic disk system of the present invention:

FIG. 23 is a plan view of the essential part of a 21st embodiment of the magnetic head assembly which is used in the magnetic disk system of the present invention;

FIG. 24 is a plan view of the essential part of a twenty-second embodiment of the magnetic head assembly which is used in the magnetic disk system of the present invention;

FIGS. 27A and 27B are a front view and a plan view of the magnetic head assembly of FIG. 26 for explaining the essential part of the reproducing head in detail;

FIG. 28 is a circuit diagram of a reproducing circuit used with the reproducing head;

FIG. 34 illustrates a relationship between position signals in the magnetic disk unit and track pulses generated by a track pulse generator;

FIG. 35 illustrates a two-phase position signal obtained from an optical sensor unit constituting the magnetic disk unit and a position signal converted by a position signal producing circuit;

DETAILED DESCRIPTION OF THE PREFERRED EMBODIMENTS

A magnetic disk system of the present invention is constructed from a magnetic head assembly which writes data on or reads data from a magnetic disk serving as a recording medium and a magnetic disk unit which reproduces an electric signal from a magnetic signal recorded on a track while causing the magnetic head assembly to track the track correctly.

In the first place, a description will be made of a magnetic head assembly used in the magnetic disk system of the present invention with reference to FIGS. 1A, 1B, 2A and 2B.

Figure 1A:
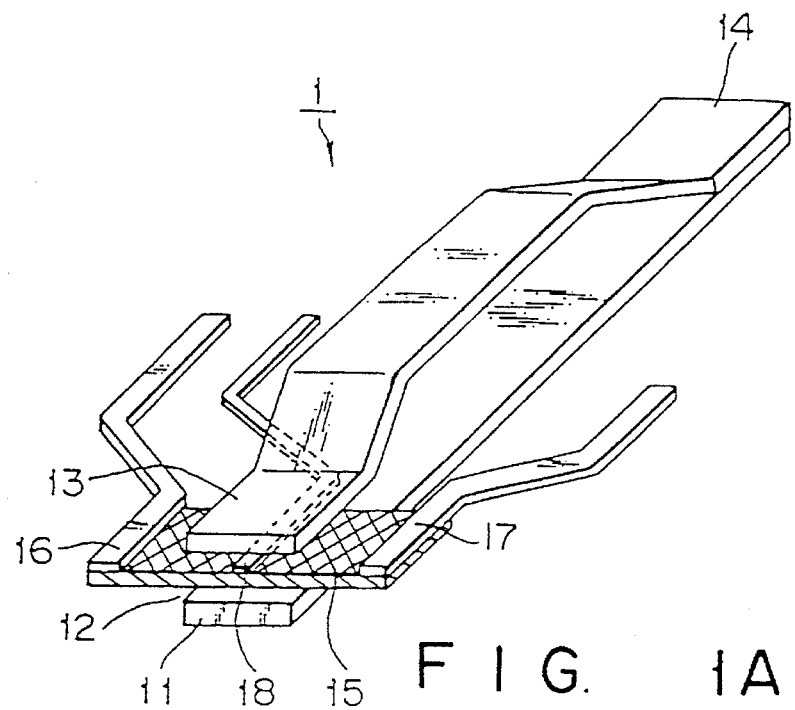
FIG. 1A is a perspective view of a first embodiment of a magnetic head assembly which is used in a magnetic disk system of the present invention.
Figure 1B:
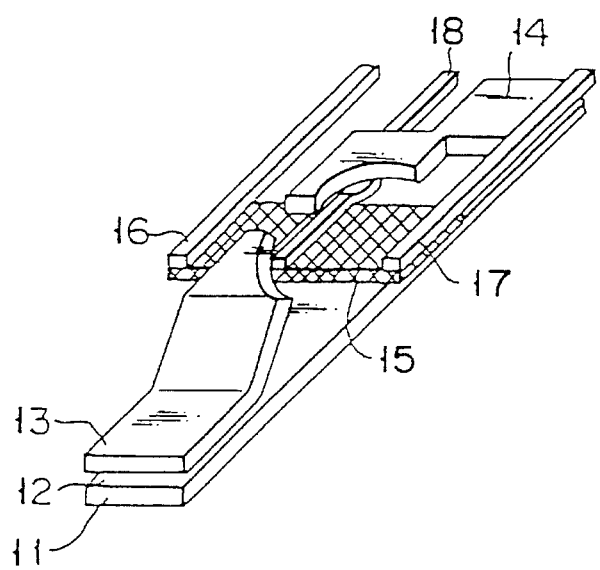
FIG. 1B is a perspective view of a modification of the first embodiment of the present invention.
Figure 2C:
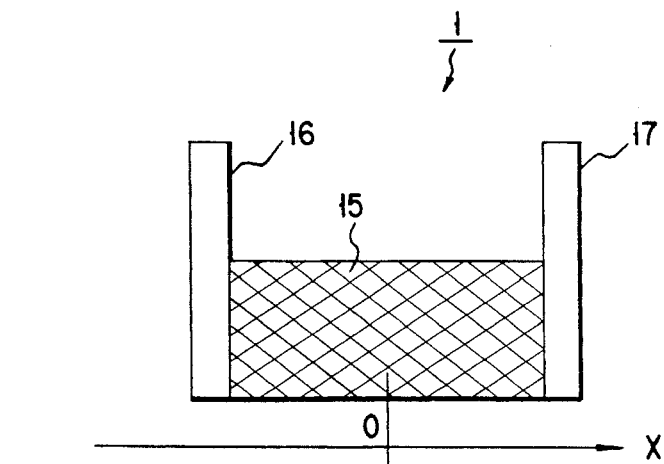
FIG. 2C is a plane view of the essential part of a conventional magnetic head.

FIGS. 1A and 1B are perspective views of a first embodiment and it's modification of the magnetic head assembly constituting the magnetic disk system of the present invention, and FIGS. 2A and 2B are each a plan view of that essential part of the head assembly which is near to an MR film 15. The magnetic head (hereinafter referred to as the head) is featured by a structure in which the magnetic material film (MR film) 15 having the magnetoresistance effect is disposed in the direction of the width of a track of the magnetic recording medium.

The magnetic head assembly 1 is constructed from a lower core 11 consisting of a soft magnetic material, an MR film 15 which is disposed substantially parallel to the direction of the track width of a magnetic recording medium (not shown) in such a way that it is sandwiched between the lower core 11 and upper core 13, (14) with a gap 12 formed between it and the lower core, a pair of current supply electrodes 16 and 17 disposed at both ends of the MR film 15 which are opposed in the direction of the track width and a signal detect electrode 18 which is disposed to contact the MR film 15 at the middle point between the current supply electrodes 16 and 17. The head assembly is characterized in that the width of the signal detect electrode 18 is smaller that of each of the current supply electrodes 16 and 17.

In the magnetic head 1 constructed as described above, when the tips of the upper core 13, (14) and the lower core 11, which are magnetic cores, are disposed to face the magnetic recording medium, leakage flux resulting from signals recorded on tracks of the magnetic recording medium flows into the MR film 15 via the cores 11 and 13, (14). The electrical resistance of the MR film varies according to the amount of leakage flux flowing thereinto. At this point, a flow of a constant direct current is produced in the MR film 15 by the current supply electrodes 16 and 17, thereby producing a voltage V1 between the electrodes 16 and 18 and a voltage V2 between the electrodes 17 and 18. A difference in magnitude between the voltages V1 and V2 permits track offset to be detected and a difference in phase between V and V2 permits azimuth offset to be detected. The use of these detect signals permit the alignment with tracks and azimuth alignment of the read/write head.

In the above case, that part of the MR film 15 which contacts the signal detect electrode 18 forms insensitive region (so called dead zone) in which variations in electrical resistance do not contribute to the voltages V1 and V2. In order to explain the above phenomenon, a relationship between the track off-set of the head assembly and the difference in magnitude between V1 and V2 is depicted graphically in FIG. 25. In the figure, the track width and the dead-zone width are indicated by TW and $\beta$, respectively. In order for the head to track a track correctly, the servo control is performed so that the difference in magnitude, that is, the position signal will become zero.

In the servo control, the higher the S/N ratio of the position signal, the more the accuracy with which the head is positioned on a selected track increases. The wider the linear range of the position signal with respect to the track center, the higher the stiffness against disturbance and the less the positioning error. However, as the width of the dead zone increases, the S/N ratio of the position signal decreases and the linear region of the position signal narrows as may be seen from FIG. 25.

That is, for the linear range obtained when $\beta=0$ ($k=\infty$) in equation $\beta=TW/k$, a mere narrow linear expressed by $1-1/k$ is obtained.

According to the rule of thumb, in order to perform good servo control it is desired that the linear range be $2/3$ or more of the track width Tw. In other words, the width $\beta$ of the dead zone, i.e., the width of the signal detect electrode 18 must be set to $1/3$ or less of the track width TW. Also, in order to permit high-sensitivity detection of azimuth offset under the high ratio condition, it is desired that the signal detect electrode 18 be narrow in width.

By coupling a recording thin film coil (not shown) with the lower core 11 or the upper cores 13, (14), the use of the magnetic head assembly according to the present embodiment as a read/write head is allowed. As a reproduced signal in this case, use may be made of, for example, a sum signal of V1 and V2.

As explained in the first embodiment, in the servo system using three terminal heads, a peak value PA of a signal SA read from a current supply electrode 16 and a signal detect electrode 18 (so called central electrode) and a peak value PB of a signal SB read from a signal detect electrode 18 and a current supply electrode 17 are equal to each other. In this case, the peak value PA is an envelope value, which can be obtained after half-wave rectifying or full-wave rectifying the signal SA, and the peak value PB is an envelope value, which can be obtained after half-wave rectifying or full-wave rectifying the signal SB. In other words, a tracking is performed so as to establish the following equation.

$P=PA-PB=0$

In this case, as a prerequisite condition, it is essential that the amplitude of the signal SA and that of the signal SB be completely the same. If these signals SA and SB are different from each other in the amplitude, an off-track, which is proportional to its error, is generated.

Figure 2D:
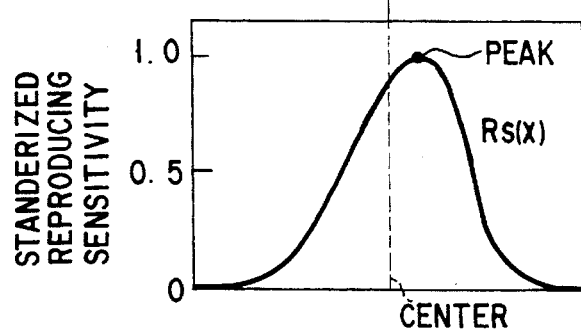
FIG. 2D is a sensitivity distribution diagram of the conventional magnetic head in FIG. 2C.

However, in general, the MR head has a characteristic of an asymmetrical distribution curve ($\cap$) in a reproducing sensitivity distribution in a direction of a track width of the MR film based on the following reason (cf. FIG. 2D).

In a case that the central electrode 18 is provided at the central position between the electrodes 16 and 17, there is generated a difference between the signals SA and SB in the amplitude when the head is in an on-track state since the producing sensitivity distribution is asymmetrical to the axis passing the central position. As a result, there is a case that an error will occur in the tracking operation.

In the MR head using a principle in which a signal is detected based on the the variation of the resistance of the MR film in accordance with the change of the magnetic direction (e.g., magneto-resistive effect), the following current supply is performed in order to increase the variation rate of the resistance and effectively detect the signal.

More specifically, a bias current is supplied between the electrodes 16 and 17 such that the magnetic direction of the MR film has an inclination of about several tens degrees (at least <90°) to a vertical direction from the surface of the recording medium.

Figure 2E:
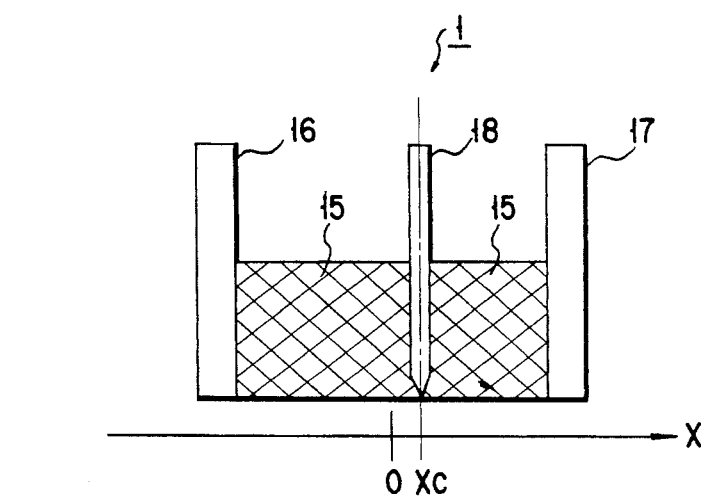
FIG. 2E is a plan view of the essential part of a magnetic head.
Figure 2F:
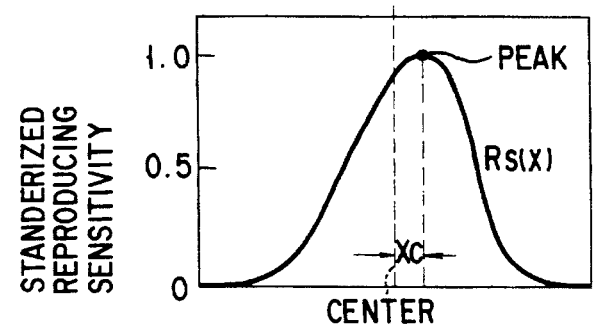
FIG. 2F is a sensitivity distribution diagram of the magnetic head in FIG. 2E.

However, in actual, the magnetization is not uniformly rotated in the MR film between the electrodes 16 and 17. Due to such a magnetic rotation, as shown in FIG. 2D, the reproducing sensitivity distribution curve ($\cap$), which presents the maximum peak of the reproducing sensitivity detected at a point (position Xc) being slightly out of the physical central position 0 (as origin) between both electrodes, and which is asymmetrical to the vertical axis passing the origin, is resultingly drawn. The graph of FIG. 2D is the curve graph showing one example of actual data of the reproducing sensitivity distribution of a suitable bias current value in a direction of a track width. In other words, The graph of FIG. 2D shows the reproducing sensitivity distribution of the magnetic head 1 having the different structure from the magnetic head of FIG. 2E. More specifically, the magnetic head 1 of FIG. 2D comprises two electrodes 16 and 17. Unlike the magnetic head of FIG. 2E, the central electrode 18 is not provided in the vicinity of the central portion between electrodes 16 and 17. However, in the case of the magnetic head of FIG. 2E comprising three electrodes 16, 17 and 18, since the central electrode 18 is used to detect a signal in which no supply of the bias current is performed, no influence is exerted upon the reproducing sensitivity distribution itself. Therefore, even in the above two different types of terminal structure, the asymmetry of the graph curve is similarly formed. As the other factor, which brings about the asymmetry of the graph curve, there can be considered ununiformity of thickness of the MR film 15, which may be generated in the manufacture.

In consideration of the above point, the following embodiment will explain further improvement.

More specifically, the central electrode 18 of this embodiment is attached to a predetermined position on the MR film 15 such that the amplitude of the signal SA read from the electrode 16 and the central electrode 18 in the on-track state and that of the signal SB read from the central electrode 18 and the electrode 17 are equal to each other. The position of the attachment of the central electrode 18 is specified by the following method.

(1) First of all, in a case of a suitable bias current value having the smallest wave distortion, the reproducing sensitivity distribution of the MR film 15 is measured.

(2) Based on the measured reproducing sensitivity distribution, a function of the reproducing sensitivity distribution is defined as Rs(x), and obtain a relative position xc from the physical central position (i.e., origin x=0) such that the following equation of an integral can be established.

Integral value of Rs(x) from minus infinity to xc=integral value of RS(x) from xc to plus infinity, that is:

$$\int_{-\infty}^{xc} Rs(x)dx = \int_{xc}^{+\infty} Rs(x)dx$$

wherein x: position of the track width direction (value of coordinate x).

(3) The central electrode 18 is attached to the relative position xc from the central position (i.e., x=0) between both electrodes 16 and 17.

The above-mentioned method, that is, in the case that the center between the electrodes 16 and 17 provided to be spaced from each other is defined as the origin x=0, the position, which is from the origin to the relative position xc, where the central electrode 18 is provided, is calculated as a suitable position where the central electrode is actually provided, in order to obtain the position of the central electrode 18 extending to the distance xc from the origin.

By the above calculation method of the suitable position of the central electrode 18, the above-mentioned disadvantage is improved by realizing the MR head based on the above method for specifying the actual position on the sensitivity when the magnetic head is actually used in order not to generate the offset on the sensitivity as the theoretically product based on only the size of the design of the other example.

However, even in the MR head 1 having the structure in which three terminals are suitably provided, there may actually occur a case that an error in attaching the central electrode 18 to the correct position will be generated during the assembly.

As a result, a slight error will be generated in amplitude of each of the signals SA and SB. Also, in a case that the bias current when the MR head 1 is designed and the bias current when the MR head 1 is actually used are different from each other, the change of the characteristic of the MR film 15, which is caused by the temperature change when the MR head is actually used, can be also be considered as a factor in generating the above-mentioned error.

Therefore, it is desirable that the error be corrected during the operation by the following method of other embodiment.

More specifically, a ratio R of amplitude MA to amplitude MB (reproducing signal width=MA/MB) in the signals SA and SB in the on-track state is obtained in advance. Then, a position signal P', which is obtained correcting a position signal P by use of the ratio R, is calculated based on the following equation, and the calculated value is used in correction control at the time of operation, thereby sequentially correcting the movement of the head without generating the off-track at the time of operation.

$$P'=(PA-PB)\cdot R=(PA-PB)\cdot MA/MB$$

wherein PA=an envelope value, which can be obtained after half-wave rectifying or full-wave rectifying the signal SA, and PB=an envelope value, which can be obtained after half-wave rectifying or full-wave rectifying the signal SB.

Figure 25:
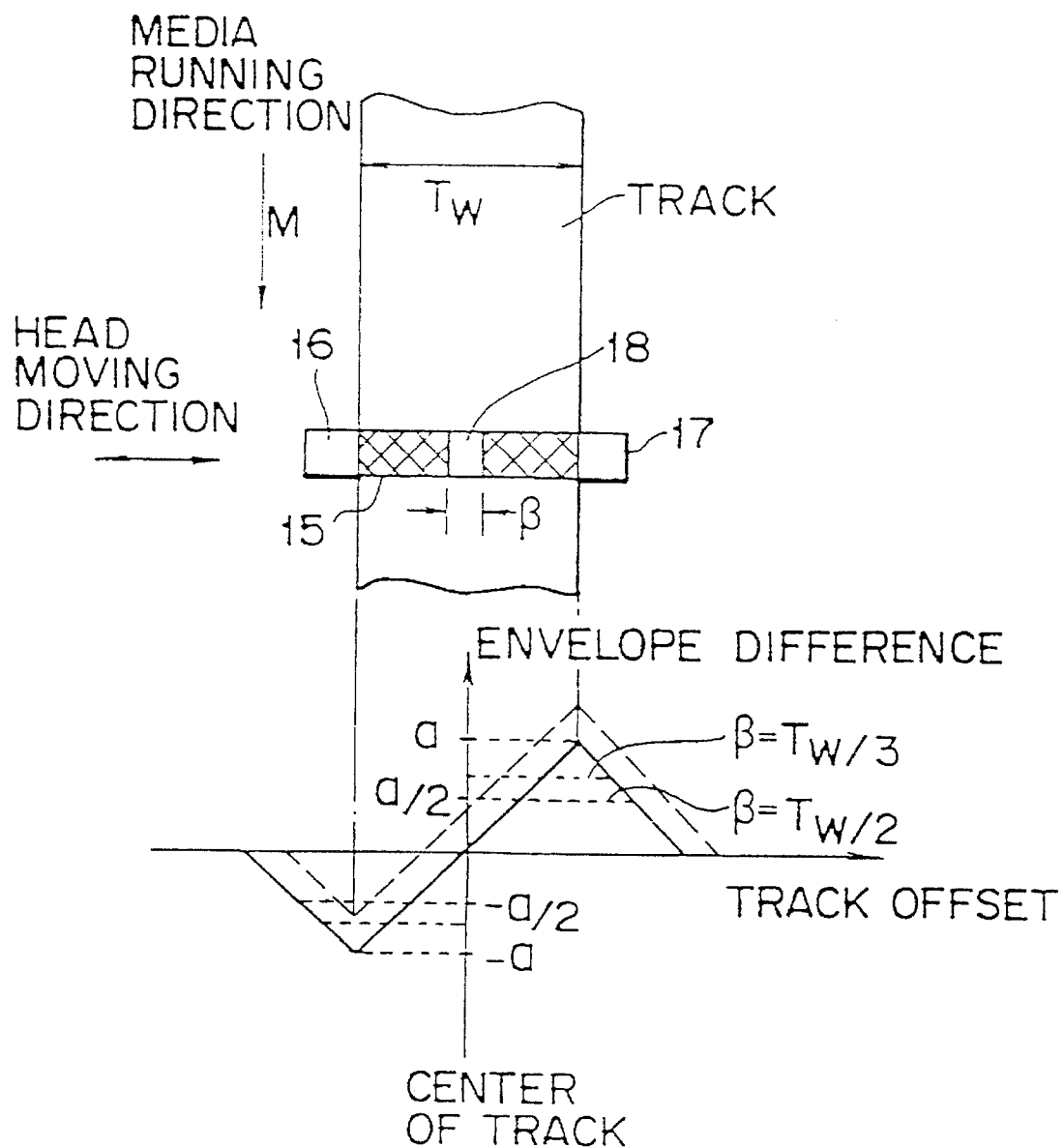
FIG. 25 illustrates a relationship between track offset and envelope difference of the magnetic head according to the present invention.

The above point can be shown by a broken line of FIG. 25 showing the relationship between an envelope difference and a track offset.

Figure 2G:
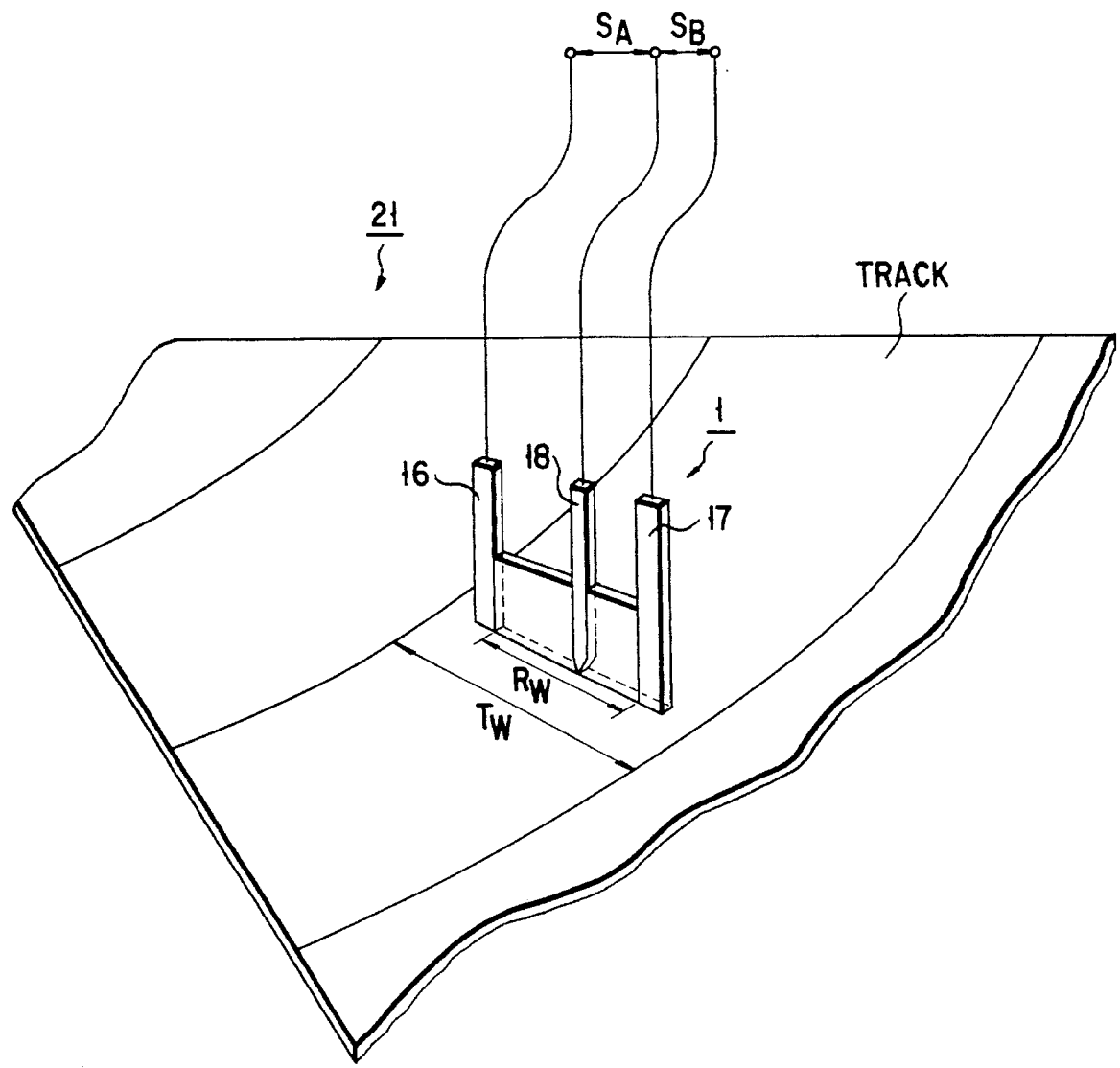
FIG. 2G is a perspective view of the magnetic head on a magnetic disk.

For obtaining the above reproducing signal width ratio R, which is the same as in the on-track state, as shown in FIG. 2G, in a region where data of the disk 21 opposite to the MR head 1 is neither recorded nor reproduced, a signal of the fixed cycle is recorded to have a wider track width Tw than the reproducing width Rw of the MR head 1 over one circumference. In this case, even in a state that tracking servo control is not performed, it is essential that the track width Tw be ensured to be sufficiently wide in order that the reproducing section having the width Rw (region between terminals 16 and 18) does not deviate from the track width Tw. Therefore, the above-mentioned conditions are satisfied, the reproducing signal width ratio R, which is the same as in the on-track state, can be always obtained.

More specifically, in the MR head 1, the signal having the above-mentioned fixed frequency is recorded in the innermost periphery or outermost periphery of the track of the retracting disk. In this case, the track width Tw of the signal may be set such that the space wider than the track vibration Vw is ensured between both sides of the track. It is desirable that the track width Tw be sufficiently widely ensured. Therefore, according to the present invention, the relationship between the track width Tw and the width Rw of the reproducing section of the head 1 in the size is set so as to satisfy either one of the following two expressions.

Tw>>Rw, Tw>Rw+Vw

By providing the above-mentioned correction method and setting the above relationship in the size, the following errors can be real-timely and dynamically corrected.

More specifically, the error of the attachment of central electrode 18, which is caused during the actual assembly, and the factor in the error, which is caused when the MR head is actually used, e.g., the case that the MR head 1 is used in the state that the bias current value differs, and the change of the characteristic of the MR film 15, which is caused by the temperature change when the MR head is actually used.

Therefore, the MR head 1, which can perform an ideal characteristic, can be realized.

According to the present invention, by a plurality of improvements in both cases that the magnetic head is designed and that the magnetic head is actually used, there can be provided a magnetic disk system having an MR head having not only an ideal static characteristic as an MR head in this technical field but also an dynamic characteristic, which can solve the disadvantages by the dynamic correcting process.

Figure 3:
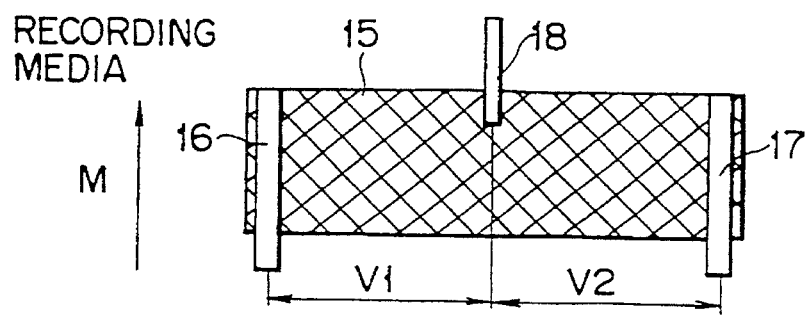
FIG. 3 is a plan view of the essential part of a second embodiment of the magnetic head assembly which is used in the magnetic disk system of the present invention.

FIG. 3 is a plan view of that part of a magnetic head according to a second embodiment which is near to an MR film. The second embodiment is distinct from the first embodiment in that the signal detect electrode 18 is formed to contact only that part of the MR film which is nearer to the direction M of the magnetic recording medium. According to the second embodiment, variations in electrical resistance in that part of the MR film 15 to which the leakage flux from the magnetic recording medium is localized is detected efficiently as a detect signal of V1–V2, thus permitting high-sensitivity detection of the track offset and azimuth offset.

Figure 4:
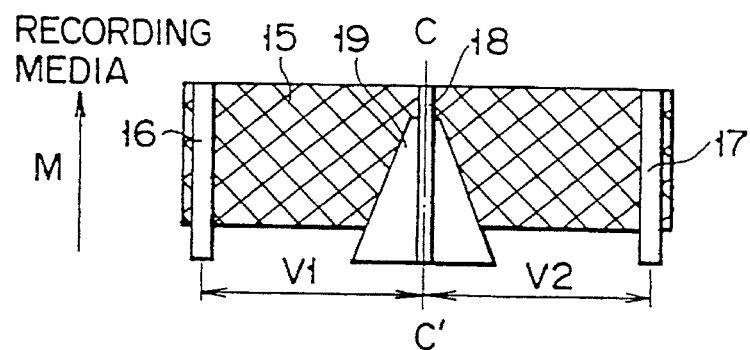
FIG. 4 is a cross-sectional view taken along line C–C' of FIG. 4.
Figure 5:
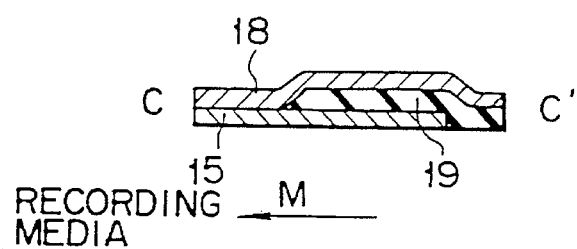
FIG. 5 is a plan view of the essential part of a third embodiment of the magnetic head assembly which is used in the magnetic disk system of the present invention.
Figure 6:
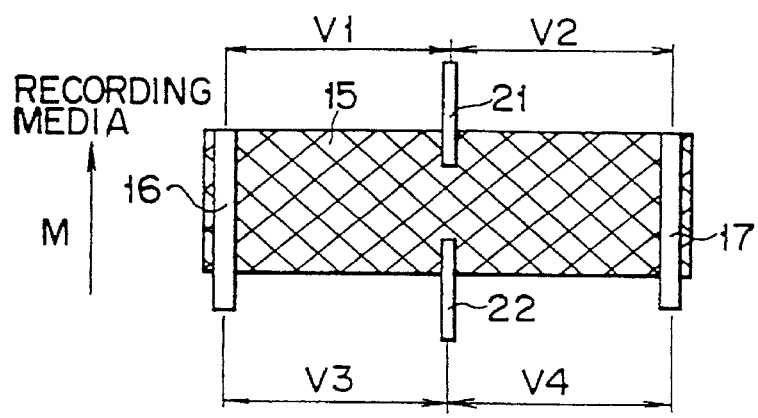
FIG. 6 is a plan view of the essential part of a fourth embodiment of the magnetic head assembly which is used in the magnetic disk system of the present invention.

FIGS. 4 and 5 are a plan view and a cross-sectional view, respectively, of the essential part of a magnetic head according to a third embodiment. In order to permit the signal detect electrode 18 to contact only that portion of the MR film 15 which is nearer to the running direction of the magnetic recording medium as in the second embodiment, an insulation film 19 is formed between the MR film 15 and the electrode 18 so that only the tip of the electrode 18 contacts the MR film 15. It goes without saying that the second embodiment also offers the same advantage as the second embodiment.

The same advantage will be obtained by forming that end of the signal detect electrode 18 which is nearer to the magnetic recording medium as shown in FIG. 2B. In this case, it is possible to secure a wide area for the flux sensing portion. The manufacture of a wide electrode is easier than that of a thin electrode.

FIG. 4 is a plan view of the essential part of a magnetic head assembly according to a fourth embodiment. In this embodiment, there are provided a first signal detect electrode 21 which contacts that portion of the MR film 15 which is nearer to the direction M of the magnetic recording medium and a second signal detect electrode 22 which contacts that part of the MR film 15 which is disposed at the opposite side to the direction M of the magnetic recording medium, i.e., which is the farthest from the magnetic recording medium. In the fourth embodiment, voltages V1, V2, V3 and V4 are detected between the current supply electrode 16 and the first signal detect electrode 21, between the current supply electrode 17 and the electrode 21, between the current supply electrode 16 and the second signal detect electrode 22 and between the electrode 17 and the electrode 22, respectively.

In this embodiment, when the magnetic head is placed off a track in the direction of the track width, there is a difference in amount of flux between the first and second portions of the MR film 15, the first portion lying between the current supply electrode 16 and the first signal detect electrode 21 which is placed nearer to the direction of the magnetic recording medium and the second portion lying between the current supply electrode 17 and the first signal detect electrode 21. However, the amount of flux between the current supply electrode 16 and the signal detect electrode 22 is substantially equal to that between the current supply electrode 17 and the second signal detect electrode 22. The amount of flux in this case is approximately half of the total amount of flux flowing into the MR film. Thus, by making a comparison in magnitude between V1 or V2 and V3 or V4, it becomes possible to see whether or not the magnetic head assembly is placed off a track.

Figure 7:
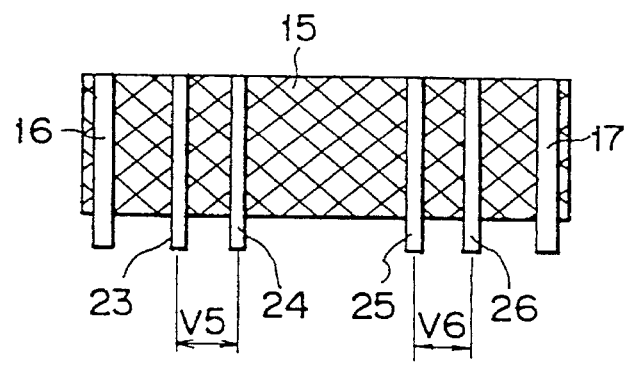
FIG. 7 is a plan view of the essential part of a fifth embodiment of the magnetic head assembly which is used in the magnetic disk system of the present invention.

FIG. 7 is a plan view of the essential part of a magnetic head according to a fifth embodiment. In this embodiment, between the current supply electrodes 16 and 17 are disposed two or more signal detect electrodes 23 to 26 (four in this example) symmetrically with respect to the center line of the MR film. The width of each of the signal detect electrodes 23 to 26 is narrower that that of the current supply electrodes 16 and 17. When constant direct current flows into the MR film 15 through the current supply electrodes 16 and 17, voltages V5 and V6 are produced between the signal detect electrodes 23 and 24 and between the signal detect electrodes 25 and 26, respectively. The detection of the voltage difference and phase difference between V5 and V6 permits track offset and azimuth offset to be detected.

According to the present embodiment, by placing the signal detect electrodes 23 to 26 in the position to permit the voltages V5 and V6 to be detected with higher sensitivity, variations in flux flowing from the magnetic recording medium into the MR film 15 can be detected more accurately as a voltage signal indicating the difference between V5 and V6.

Figure 8:
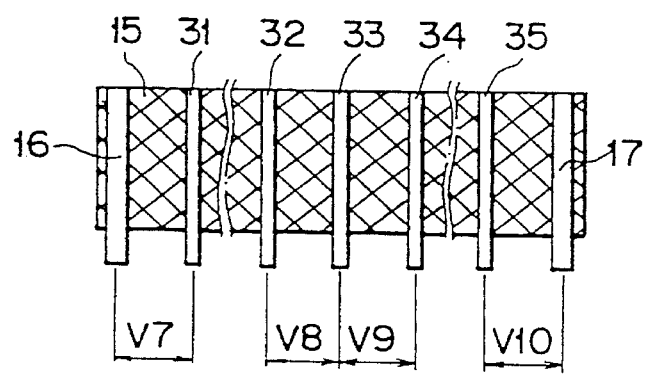
FIG. 8 is a plan view of the essential part of a sixth embodiment of the magnetic head assembly which is used in the magnetic disk system of the present invention.

FIG. 8 is a plan view of the essential part of a magnetic head according to a sixth embodiment, in which between current supply electrodes 16 and 17 are disposed more signal detect electrodes 31 to 35 symmetrically with respect to the center line of the MR film. The width of each of the signal detect electrodes 31 to 35 is narrower than that of the current supply electrodes 16 and 17. In this case, a voltage V7 between the electrodes 16 and 31, a voltage between the electrodes 32 and 33, a voltage V9 between the electrodes 33 and 34 and a voltage V10 between the electrodes 35 and 17 are detected when a constant flow of direct current is produced in the MR film 15 through the current supply electrodes 16 and 17. Further, the voltage difference and phase difference between V7 and V10 and between V8 and V9 are obtained to detect the track offset and azimuth offset.

According to the present invention, the inclination of the magnetic head in the direction of the track width can be detected with high sensitivity on the basis of the difference between a symmetrical pair of voltage: V7 and V10; and V8 and V9.

FIG. 9 is a plan view of a magnetic core of a magnetic head assembly according to a seventh embodiment. The core nearer to the magnetic recording medium is divided into two pieces indicated at 13a and 13b along the track width, thereby dividing the leakage flux flowing from the magnetic recording medium into two. The flux flowing into the MR film 15 is also divided into two in the direction of the track width. Thus, the voltage difference and phase difference between voltages, V1, V2, V3, V4, V5, V6, V7, V10, V8, V9 can be detected with higher sensitivity.

FIG. 10 is a plan view of a magnetic core of a magnetic head according to an eighth embodiment. Between the divided upper cores 13a and 13b is disposed a superconducting film 37. In the case of the eighth embodiment, the leakage flux from the magnetic recording medium flows to avoid the superconducting film 37. Thus, the flux flows completely separated into the upper cores 13a and 13b, offering the same advantage as obtained in the eighth embodiment more remarkably.

FIG. 11 is a plan view of a magnetic core of a magnetic head according to a ninth embodiment. A notch 40 is formed at the center of that each of the upper cores 13 and 14 which is located on the center of the MR film 15. With such a shape, that end portion of the core 13 which is nearer to the magnetic recording medium and thus sensitive to leakage flux from the magnetic recording medium is continuous in the direction of the track width. The provision of the notches 40 at the central portions of the upper cores 13 and 14 on the side of the MR film 15 permits the leakage flux to flow while branching right and left in the direction of the track width, thus providing the same advantage as the seventh and eighth embodiments.

Figure 12:
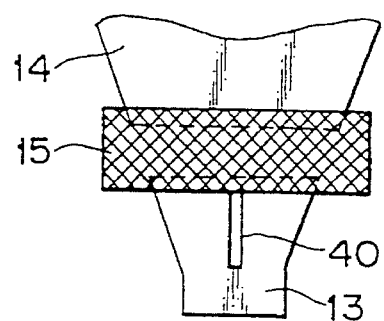
FIG. 12 is a plan view of the essential part of a tenth embodiment of the magnetic head assembly which is used in the magnetic disk system of the present invention.

FIG. 12 is a plan view of a magnetic core of a magnetic head assembly according to a tenth embodiment. In this embodiment, notch 40 is formed only at the core 13 which is sensitive to the leakage flux from the magnetic recording medium. The tenth embodiment will also provide the same advantage as the ninth embodiment.

Figure 13:
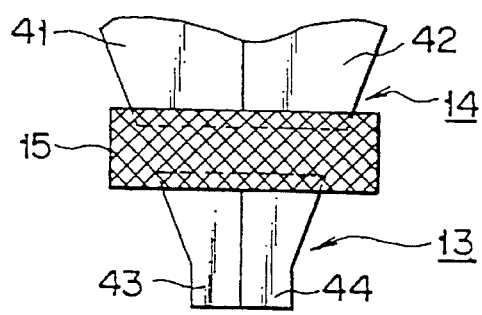
FIG. 13 is a plan view of the essential part of an eleventh embodiment of the magnetic head assembly which is used in the magnetic disk system of the present invention.

FIG. 13 is a plan view of a magnetic core of a magnetic head assembly according to an eleventh embodiment. The upper and lower cores 13 and 14 are each divided into two pieces 43 and 44, 41 and 42 in the direction of the track width, and moreover the magnetic permeability of the pieces 41 and 43 is made different from that of the pieces 42 and 44.

By making the right and left sides of the magnetic core different from each other in magnetic permeability, a difference is produced between variations in the amount of flux flowing into the right and left sides of the core. Moreover, the difference will vary between when the head moves to the right from the track center and when the head moves to the right from the center. Thus, by detecting a difference signal as in the first to sixth embodiments, the direction and amount of the track offset of the magnetic head assembly can be detected.

Figure 14:
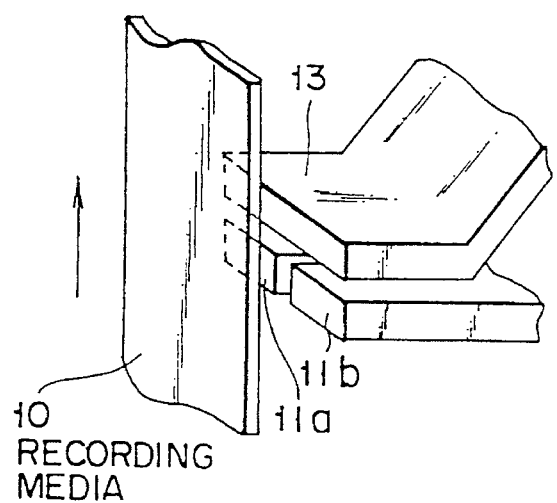
FIG. 14 is a plan view of the essential part of a twelfth embodiment of the magnetic head assembly which is used in the magnetic disk system of the present invention.

FIG. 14 is a perspective view of a magnetic core of a magnetic head assembly according to a twelfth embodiment. The magnetic core of this embodiment is formed such that the lower core (i.e., leading edge side) divided into pieces 11a and 11b in the direction of the track width and the upper core 13 (i.e., trailing edge side) is not divided in the direction of the track width. According to the magnetic head assembly of such a form, continuous recording can be made in the direction of the track width at the time of recording and the leakage flux from the magnetic recording medium can be divided right and left in the direction of the track width at the time of reproducing. In this case, it is desired that the divided lower cores 11a and 11b be placed on the opposite side to the running direction of the magnetic recording medium as shown.

The above-described embodiments (from FIG. 2 to FIG. 8) are applicable to shiled-type MR head and yoke-type MR head shown in FIG. 1A and FIG. 1B.

The embodiments (from FIG. 9 to FIG. 14) are also applicable to yoke type MR head shown in FIG. 1B.

Hereinafter, descriptions will be made of embodiments in which first and second magnetic detecting elements are disposed separated in the direction of the track width. FIGS. 15 to 24 illustrate these embodiments.

FIG. 15 is a perspective view of a magnetic head assembly according to a thirteenth embodiment. Each of first and second magnetic detecting elements 50a and 50b, which are disposed separated in the direction of the track width and parallel to each other, comprises an MR film 15, a pair of current supply electrodes 16 and 17 disposed to contact both edges of the MR film which are opposed to each other in the direction of the track length and a signal detect electrode 18 disposed between the current supply electrodes to contact the MR film.

Between the first and second magnetic detecting elements 50a and 50b are disposed magnetic cores 51 to 53 in the form of a ring. A gap 54 is formed between the magnetic cores 51 and 52 which is in contact with the magnetic recording medium. Gaps are also formed between the cores 51 and 53 and between the cores 52 and the MR films 15 of the magnetic detecting elements 50a and 50b are disposed to sandwich these gaps between the cores 51 and 53 and between 52 and 53 from the direction of the track width.

With the magnetic head assembly constructed as above, when the lower surfaces of the magnetic cores 51 and 52 are brought into contact with the magnetic recording medium, leakage flux based on signals recorded on tracks of the recording medium flows into the MR films 15 of the magnetic detecting elements 50a and 50b via the magnetic cores 51 to 53. As a result, the electrical resistance of the MR films varies with the amount of flux. In this case, the leakage flux divides into the MR films of the magnetic detecting elements 50a and 50b and thus the amount of flux flowing into each of the MR films can be detected independently. This permits the track offset and azimuth offset to be detected with higher accuracy.

When a constant flow of direct current is produced in the MR film through the current supply electrodes 16 and 17 and a difference between a voltage developed between the electrodes 16 and 17 and a voltage developed between the electrodes 17 and 18 is obtained as a detect signal, the polarity and magnitude of the detect signals obtained for the magnetic detecting elements 50a and 50b vary according to a difference in variation in electrical resistance between the MR films of the magnetic detecting elements deepening on track offset and azimuth offset. The use of these detect signals permits tacking control and azimuth alignment of the read/write head.

FIG. 16 is a perspective view of a magnetic head assembly according to a fourteenth embodiment. The feature of this magnetic head assembly is that each of the MR films 15 shown in FIG. 15 is divided into two parts 15a and 15b in the direction of the track length and the tip of the signal detect electrode 18 is divided into two branches. Both of the ends of the MR film 15a are in contact with the current supply electrode 16 and one of the two branches of the signal detect electrode 18, while both of the ends of the MR film 15b are in contact with the current supply electrode 17 and the other of the two branches of the signal detect electrode 18. The present embodiment also provides the same advantage as the embodiment of FIG. 15.

FIG. 17 is a perspective view of a magnetic head assembly according to a fifteenth embodiment. In this embodiment, the electrode 17 shown in FIG. 15 is removed and the electrodes 16 and 18 are in contact with both the ends of the MR film 15 in each of the magnetic detecting elements 50a and 50b. The magnetic core 53 shown in FIG. 15 is integral with the magnetic core 52. It is supposed in this case that the electrodes 16 and 18 are used for both current supply and signal detection.

In this embodiment, a constant direct current flow is produced in the MR film 15 to detect a voltage between the electrodes 16 and 18 and a difference between voltages obtained from the magnetic detecting elements 50a and 50b is obtained as a detect signal, thus permitting the track offset and azimuth offset to be detected.

FIG. 18 is a perspective view of a magnetic head assembly according to a sixteenth embodiment. In this embodiment, the length of the MR films of the magnetic detecting elements 50a and 50b in the direction of the track length is made shorter that in the embodiment shown in FIG. 17 and the MR films are disposed to sandwich only the gap formed between the magnetic cores 51 and 52 and its neighborhood in the direction of the track width. This embodiment also provides the same advantage as the embodiment shown in FIG. 17.

Figure 19:
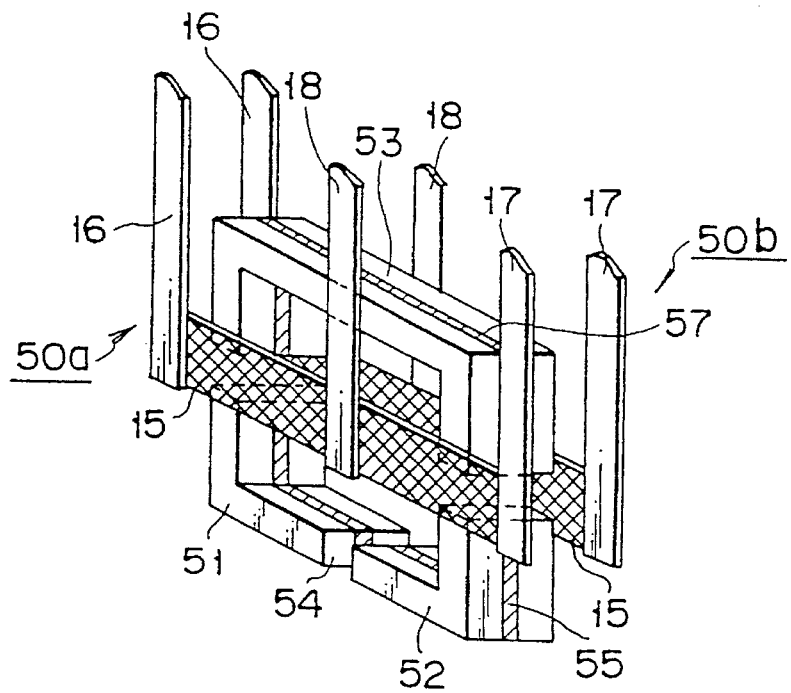
FIG. 19 is a plan view of the essential part of a seventeenth embodiment of the magnetic head assembly which is used in the magnetic disk system of the present invention.

FIG. 19 is a perspective view of a magnetic head assembly according to a seventeenth embodiment. In this embodiment, each of the magnetic cores 51 to 53 shown in FIG. 15 is divided into two pieces in the direction of the track width and a non-magnetic film (or superconducting film) 55 is disposed between the two pieces of each magnetic core. According to this embodiment, each of the magnetic cores is magnetically divided into two in the direction of the track width and hence the leakage flux divides into the MR films 15 of the magnetic detecting elements 50a and 50b, thus permitting the amount of flux flowing into each of the MR films to be detected independently. For this reason, the track offset and azimuth offset can be detected with higher accuracy.

Figure 20:
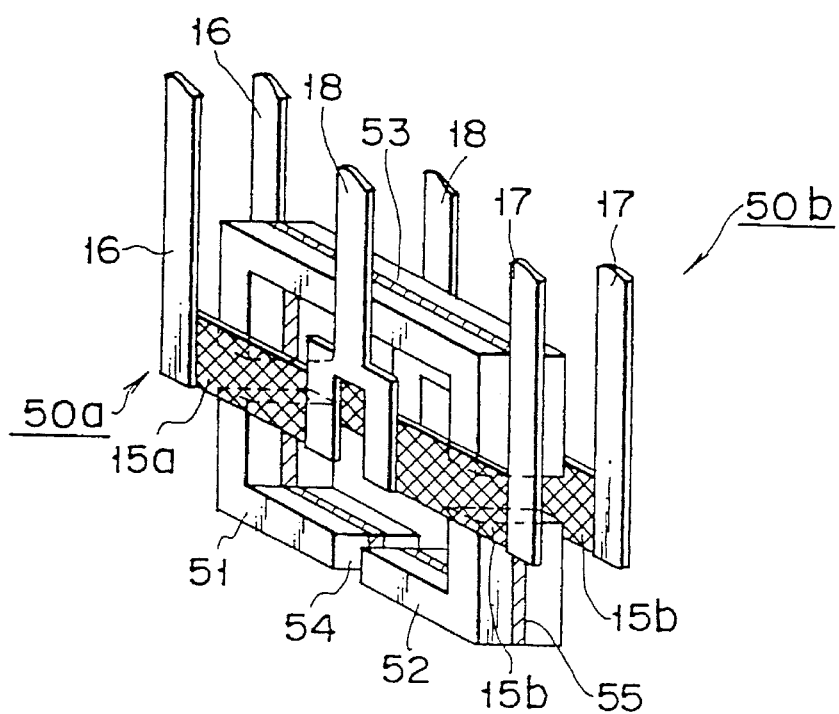
FIG. 20 is a plan view of the essential part of a eighteenth embodiment of the magnetic head assembly which is used in the magnetic disk system of the present invention.

FIG. 20 is a perspective view of a magnetic head assembly according to an eighteenth embodiment. Each of the magnetic cores 51 to 53 shown in FIG. 16 are magnetically divided into two pieces with non-magnetic film (or superconducting film) 55 interposed therebetween as in the embodiment of FIG. 19.

FIG. 21 is a perspective view of a magnetic head assembly according to a nineteenth embodiment. Each of the magnetic cores 51 and 52 shown in FIG. 17 are magnetically divided into two pieces with non-magnetic film (or superconducting film) 55 interposed therebetween.

FIG. 22 is a perspective view of a magnetic head assembly according to a twentieth embodiment. Of the magnetic cores 51 to 53 in FIG. 15 the magnetic cores 51 and 52 which are nearer to the magnetic recording medium are each magnetically divided into two pieces with non-magnetic film (or superconducting film) 55 interposed therebetween.

FIG. 23 is a perspective view of a magnetic head assembly according to a twenty-first embodiment. Of the magnetic cores 51 to 53 in FIG. 16 the magnetic cores 51 and 52 which are nearer to the magnetic recording medium are each magnetically divided into two pieces with non-magnetic film (or superconducting film) 55 interposed therebetween as in the embodiment of FIG. 22.

FIG. 24 is a perspective view of a magnetic head assembly according to a twenty-second embodiment. Of the magnetic cores 51 and 52 in FIG. 17 the magnetic core 51 which is nearer to the magnetic recording medium is magnetically divided into two pieces with non-magnetic film (or superconducting film) 55 interposed therebetween.

It will be apparent that the embodiments of FIGS. 20 to 24 can provide the same advantage as the seventeenth embodiment shown in FIG. 19 because each of magnetic cores is magnetically divided into pieces in the direction of the track width.

As described above, according to the present invention, an MR film is disposed parallel to the direction of the track width, at least a pair of current supply electrodes are provided which is in contact with both ends of the MR film in the direction of the track width or their neighborhoods and at least one signal detect electrode is provided which is narrower in width than the current supply electrodes and in contact with the MR film between the current supply electrodes. A flow of constant current is produced in the MR film by the current supply electrodes and a signal having a voltage difference or a current difference corresponding to track offset and azimuth offset is detected by the signal detect electrode. Thus, the track offset and azimuth offset can be detected with high sensitivity even when tracks of a disk are made narrow in width while the merits of magnetic heads using MR films are utilized. In this case, detection with a still higher sensitivity will be made possible by magnetically dividing that part of a magnetic core for conducting leakage flux from magnetic recording medium to a magnetic film which is nearer to the recording medium into pieces in the direction of the track width.

According to the present invention, first and second magnetic detecting elements are provided which are disposed apart from each other in the direction of the track width and each of which comprises an MR film disposed substantially parallel to the direction of the track length and at least a pair of electrodes which is in contact with both of the ends of the MR film in the direction of the track width or their neighborhoods. The first and second magnetic detecting elements are adapted to detect a signal having a voltage difference or a current difference corresponding to track offset and azimuth offset. Therefore, the dimension of the head along the track width can be made small and a sufficient area of the part adapted to sense the leakage flux from the magnetic recording medium in the MR film can be secured. Accordingly, it is possible to detect the track offset and azimuth offset with a high sensitivity in the case of disks with narrow tracks. In this case, detection with a still higher sensitivity will be made possible by providing a magnetic core for conducting leakage flux to the magnetic films of the first and second magnetic detecting elements between the first and second detecting elements and magnetically dividing that part of the magnetic core which is nearer to the recording medium into pieces in the direction of the track width.

Hereinafter, an embodiment of a magnetic disk system of the present invention will be described using a magnetic head assembly shown in FIGS. 26A, 26B and 26C.

Figure 26A:
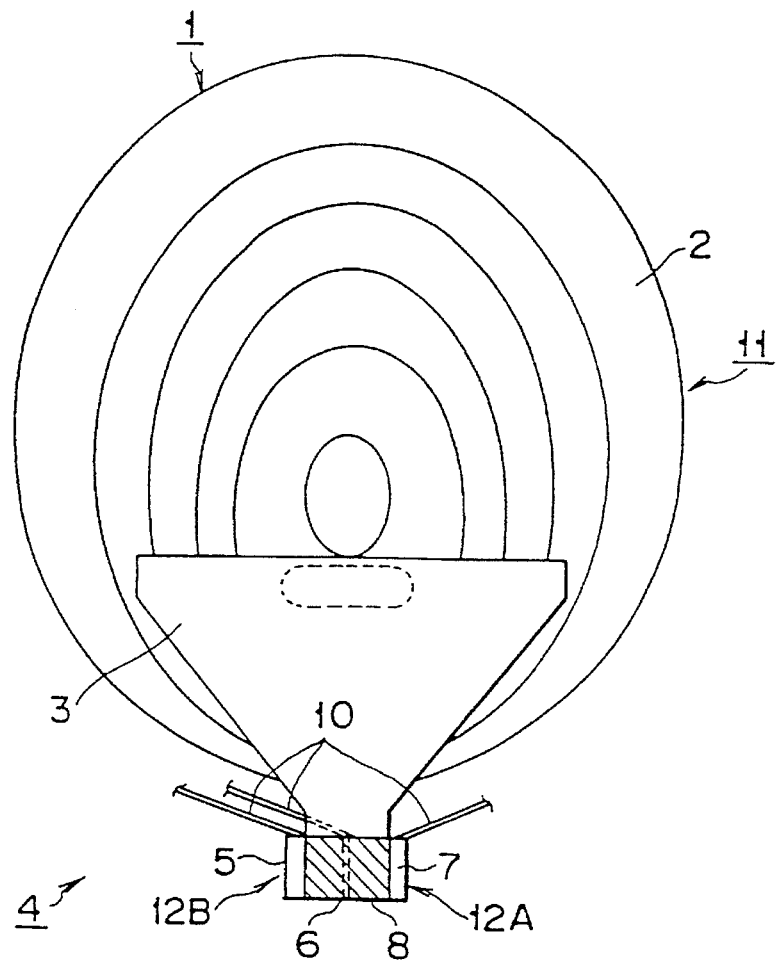
FIGS. 26A, 26B and 26C are a front view, a plan view and a side view, respectively, of still another embodiment of the magnetic head assembly used in the magnetic disk unit of the present invention.
Figure 26B:
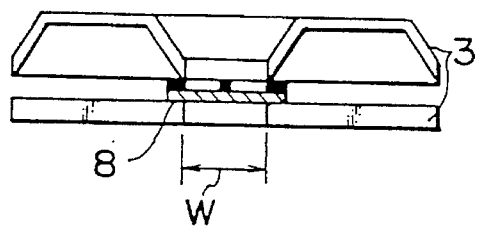
Figure 26C:
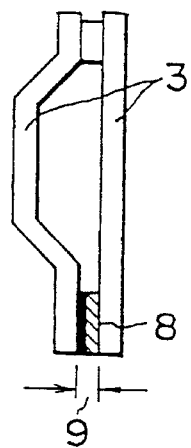

FIG. 26A is a front view of the magnetic head assembly, FIG. 26B is a plan view of the head assembly seen from its underside and FIG. 26C is a side view of the head assembly. In FIGS. 26B and 26C, a coil 2 and a lead wire 10 shown in FIG. 16A are omitted.

The magnetic head assembly (hereinafter referred to as the head) 1 is constructed from a coil 2, a yoke 3, a pole tip 4, electrodes 5, 6 and 7, a magnetic film 8 having the magnetoresistance effect (hereinafter referred to as the MR film) and a gap 9. A recording head 11 is constructed from the coil 2, the yoke 3 and the gap 9. The coil 2 is wound around the yoke 3. Two reproducing heads 12A and 12B are constructed from the yoke 3, the pole tip 4, the electrodes 5, 6 and 7 and the MR film 8. The MR film 8 is embedded in the gap at the tip of the yoke 3. The electrodes 5, 6 and 7 are formed on the surface of the MR film 8 to contact it. A lead wire 10 is connected to each of the electrodes. The lead wires 10 are adapted to conduct a current to the electrodes and detect the potential on the electrodes.

As with conventional magnetic heads, the recording of data on a magnetic disk (hereinafter referred to as a disk) serving as a magnetic recording medium is made by magnetizing the disk with leakage flux from the gap which is generated by a current flow in the coil 2 having its several turns wound around the yoke 3 serving as a flux path. Data is recorded in a width corresponding to the track width W (refer to FIG. 26B).

In a disk recording/reproducing apparatus for reproducing data recorded on the disk, as shown in FIG. 28, a constant current source 13 is connected between the electrodes 5 and 7 and a constant current 1 is caused to flow through the MR film 8 in a fixed direction. A potential difference detecting circuit 14 detects a potential difference between the electrodes 5 and 6 and a potential difference between the electrodes 6 and 7. In this case, the input resistance of the potential difference detecting circuit 14 is selected to be sufficiently high so that there is no current flow between the intermediate electrode 6 and the potential difference detecting circuit.

The electrical resistance of the MR film 8 with the magnetoresistance effect varies according to variations in flux caused by data recorded on the disk. Here, let the potentials on the electrodes 5, 6 and 7 be V1, V2 and V3, respectively. Further, suppose that the resistance of the MR film between electrodes 5 and 6 is R1 and the MR film resistance between electrodes 6 and 7 is R2. Then, the supply current I and the potentials V1, V2 and V3 will be related by $$R1=(V1-V2)/I$$

$$R2=(V2-V3)/I \qquad (1)$$

The supply current I is constant and variation in flux is proportional to variation in the resistance of the MR film 8. Thus, the following relations will be obtained.

$$\phi 1 \propto R1 \propto (V1-V2)$$

$$\phi 2 \propto R2 \propto (V2-V3) \qquad (2)$$

By the reproducing head 12A, the variation of flux which varies, in the direction of the gap, within the width WB is detected as a variation of the resistance of the MR film in the region A between electrodes 6 and 7. The electric potential difference (v1–v2) is detected as the output signal VA by the potential difference detecting circuit 14.

By the reproducing head 12B, the variation of flux which varies, in the direction of the gap, within the width WA is detected as a variation of the resistance of the MR film in the region B between electrodes 5 and 6. The electric potential difference (V2–V3) is detected as the output signal VB by the potential difference detecting circuit 14. Then, the data recorded as the output signal VB is reproduced within the width WB.

In the present embodiment, only one electrode 6 is disposed between the electrodes 5 and 7 to construct the two reproducing heads 12A and 12B. The electrode 6 is disposed at the middle point between the electrodes 5 and 7. Thus, WB=WA=W/2.

If a number N of electrodes were disposed between the electrodes 5 and 7, a number (N+1) of reproducing heads each having a reproduce width determined by the spacing between adjacent electrodes would be realized. Since the MR film is adapted to detect variations in flux, the amplitude of reproduced signals is constant independently of wavelengths of data recorded on the disk. Therefore, there is no need for an AGC (Auto Gain Control) circuit for compensating for reproducing signal width on inner and outer tracks of the disk.

Figure 29:
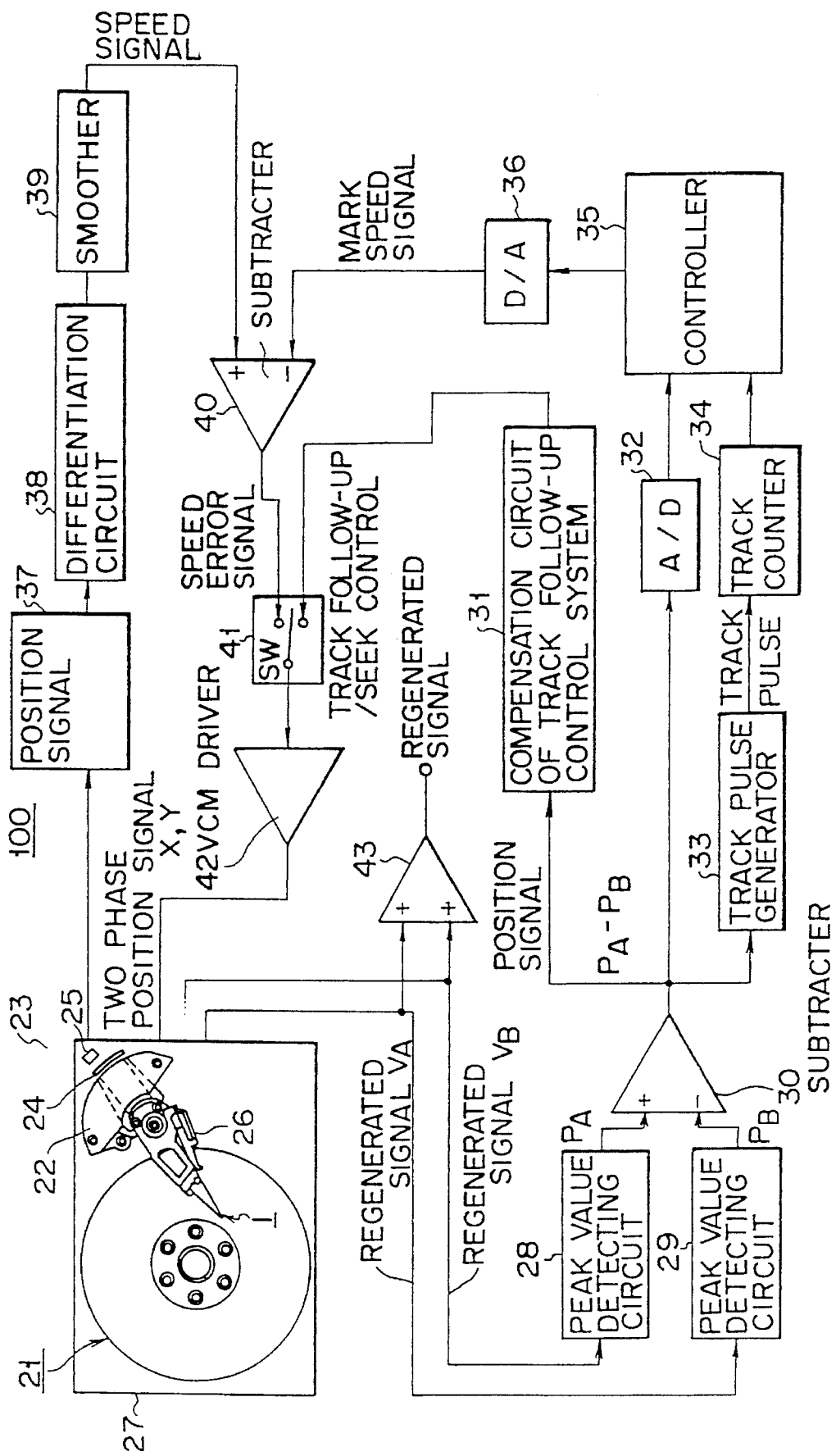
FIG. 29 is a functional block diagram of a magnetic disk unit constituting the magnetic disk system of the present invention.

FIG. 29 is a block diagram of a head positioning control system of the magnetic disk unit which includes the head 1, the constant current source 13 and the potential difference detecting circuit 14 which were described in connection with FIGS. 26A to 28. In this embodiment, a rotary type actuator is used as actuator 22 for moving the head on a disk 21.

An optical position sensor 23 is provided for detecting the displacement of the head 1 from the outside of the disk. The optical position sensor 23 is constructed from a reflection type scale 24 in which reflecting portions and non-reflecting portions are disposed alternately and at regularly spaced intervals and two sets of optical sensor units (one of which is a combination of light emitting devices and light receiving devices) 25. The reflection type scale 24 is built in the moving portion of the actuator 22 and the optical sensor units 25 are mounted on a drive base 27. A read/write circuit 26 includes a read circuit having the constant current source 13 and the potential difference detecting circuit 14 described in connection with FIG. 28.

To produce a position signal indicating the position of the head 1 relative to a data track on the disk 21 from the reproduced signals VA and VB output from the reproducing heads 12A and 12B of the head assembly 1, peak detectors 28 and 29 and a subtracter 30 are provided. The position signal is applied to a tracking servo circuit 31. An A/D circuit and a track pulse generator 33. An digital output of the A/D converter 32 and track pulses from the track pulse generator 33 are applied to a controller 35, which produces a desired speed signal. As the controller 35, a microprocessor may be used.

On the other hand, the two-phase position signal output from the optical position sensor 23 is converted to a position signal of a prescribed signal form by a position signal producing circuit 37 and then processed by a differentiator 38 and a smoother 39 to produce a speed signal. A difference between the speed signal and the desired speed signal is calculated by the subtracter 40 to produce a speed error signal. For switching between the tracking control and the seek control, switching between the speed error signal and the position signal output from the tracking servo compensating circuit 31 is made by a switch 41. A signal selected by the switch 41 is applied to a voice coil motor (VCM) driver 42 which drives a voice coil motor which is a drive unit for an actuator 22.

The reproduced signals from the reproducing heads 12A and 12B are also applied to an adder 43, so that they are added together. Thereby, data on the disk is reproduced.

Next, the operation of the magnetic disk unit will be described.

First, a description will be made of a method of recording a disk-formatting signal consisting of data of a prescribed format on an unrecorded disk at the time of initial use of the disk with reference to FIGS. 30 and 31.

Figure 30:
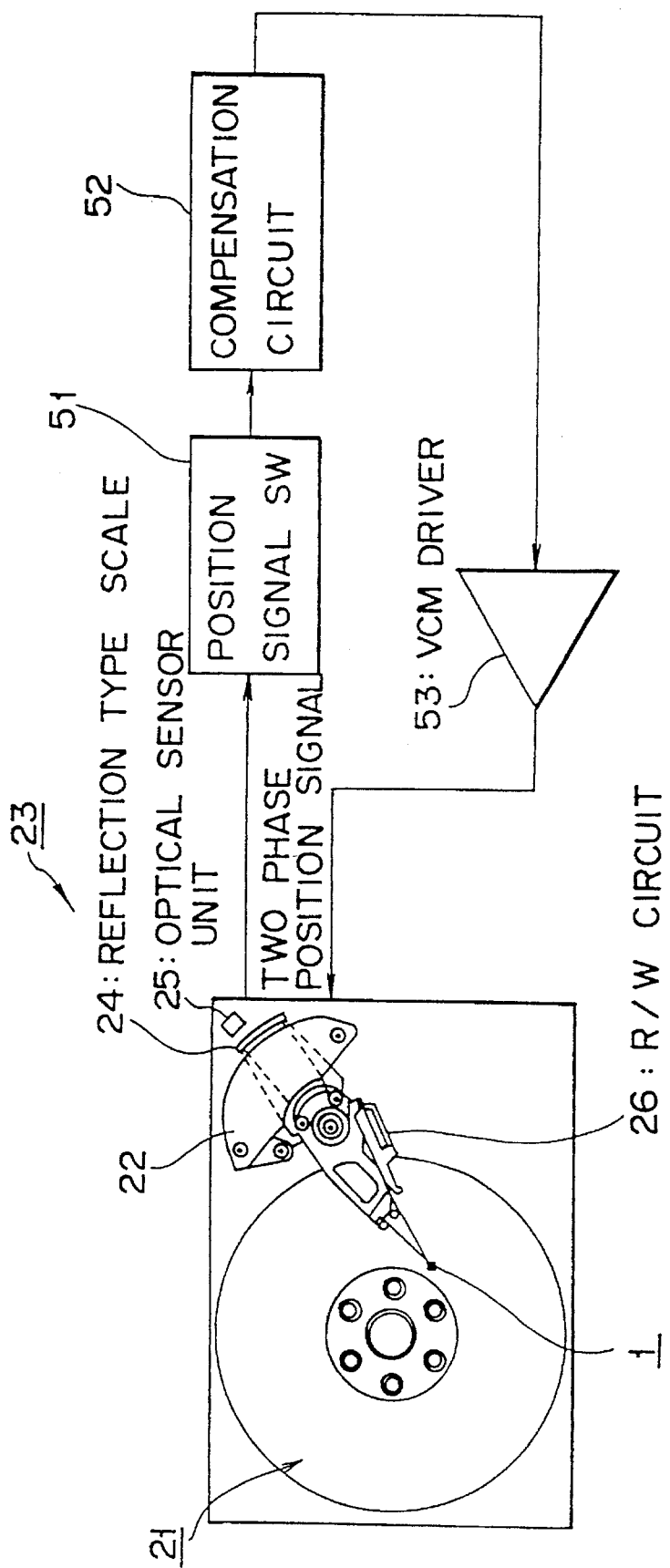
FIG. 30 is a functional block diagram of a head positioning control system for initial formatting of a disk.
Figure 31:
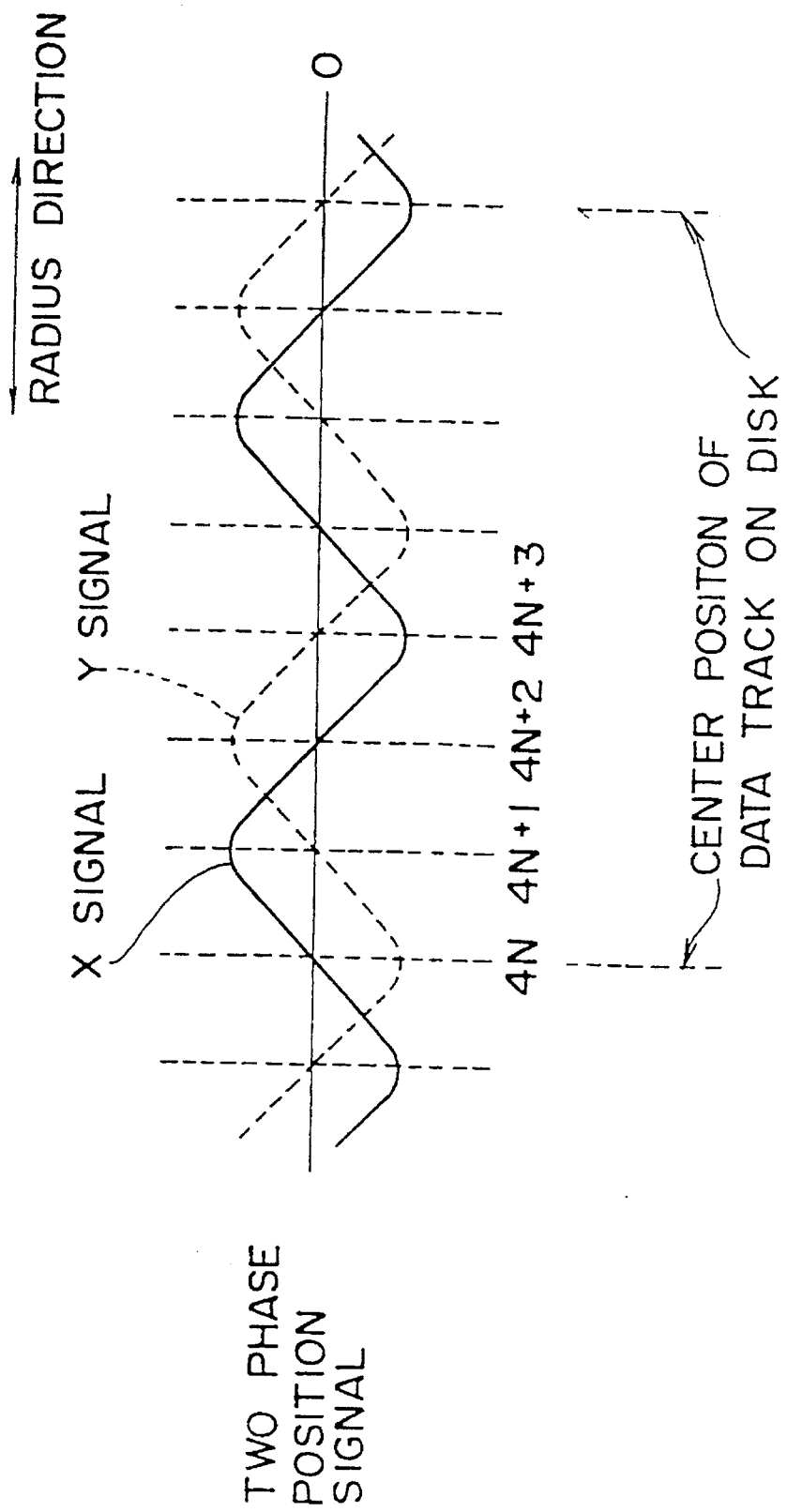
FIG. 31 is a waveform diagram of two-phase position signals detected from an optical sensor unit constituting the magnetic disk unit of FIG. 29.

FIG. 30 is a block diagram of a head positioning control system for initial disk formatting. When the actuator 22 carrying the head assembly 1 moves on the disk 21 along its radial line, a two-phase position signal (X, Y) shown in FIG. 31 are obtained from the optical position sensor 23. The position signals X and Y are applied to compensation circuit 52 via the position signal switching circuit 51, thereby performing feedback position control on the actuator 22 so that the magnitude of the position signals becomes zero. That is, the head assembly 1 is located in a position where the position signals X and Y become zero. The compensation circuit 52 compensates for the phase and gain of the feedback servo loop. A zero point of the position signals X and Y of FIG. 31 corresponds to the center of a predetermined data track (the 4N-th data track in the case of the figure) on the disk 21. Thus, the feedback position control permits the positioning of the head assembly 1 at a predetermined track pitch. The formatting data is recorded on the whole surface of the disk 21 while the head assembly 1 are positioned on each of the data tracks in that way.

Figure 32:
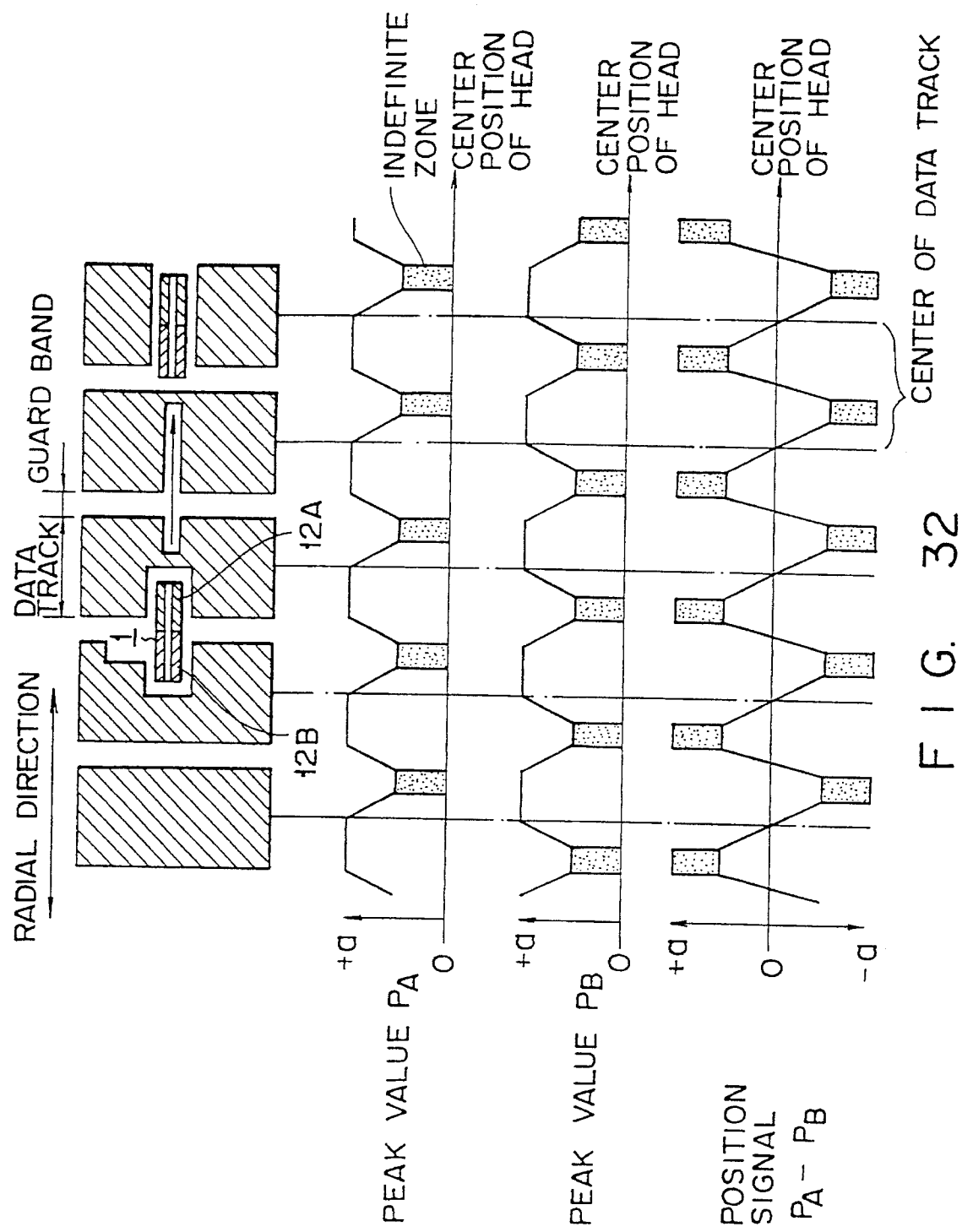
FIG. 32 illustrates a relationship among the position of the magnetic head, peak values of the reproduced output of the reproducing head and position signals for head positioning.
Figure 33:
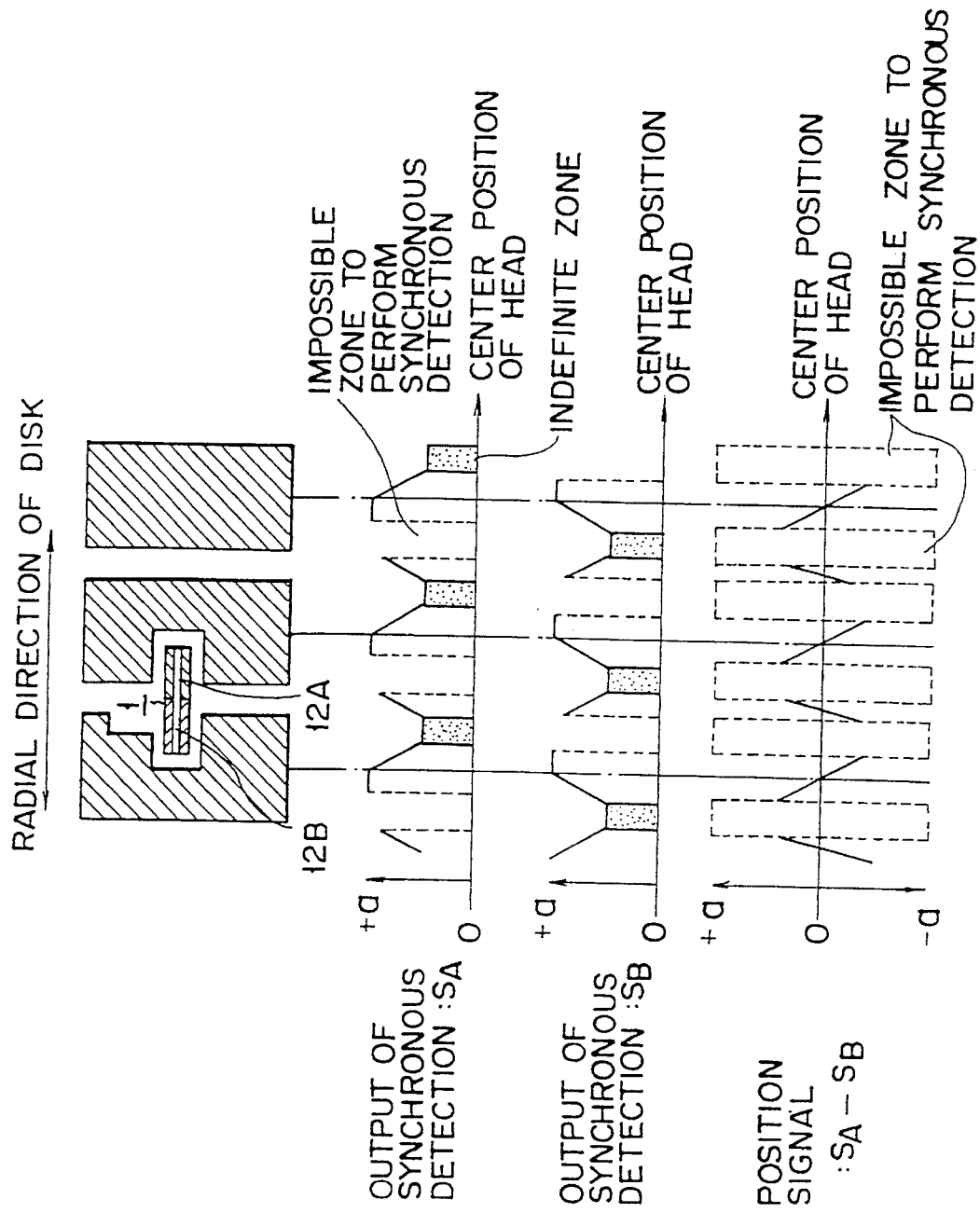
FIG. 33 illustrates a relationship among the position of the magnetic head, the synchronous detect output of the reproduced output from the reproducing head and the position signals.
Figure 36:
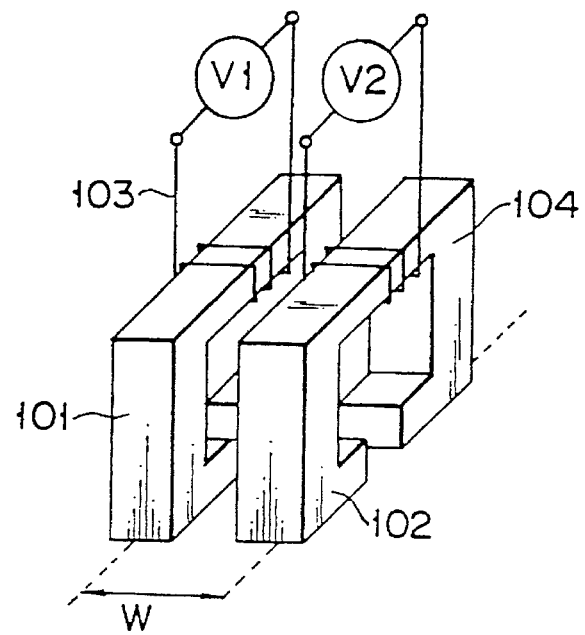
FIG. 36 is a perspective view of a conventional induction type magnetic head.
Figure 37:
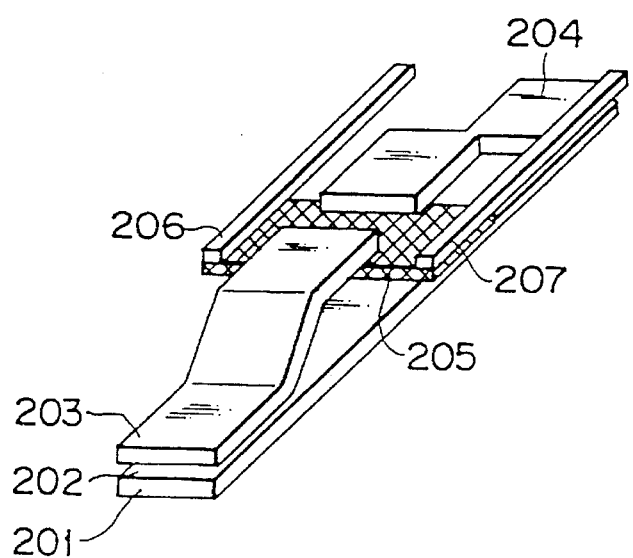
FIG. 37 is a perspective view of a conventional yoke type MR head.
Figure 38A:
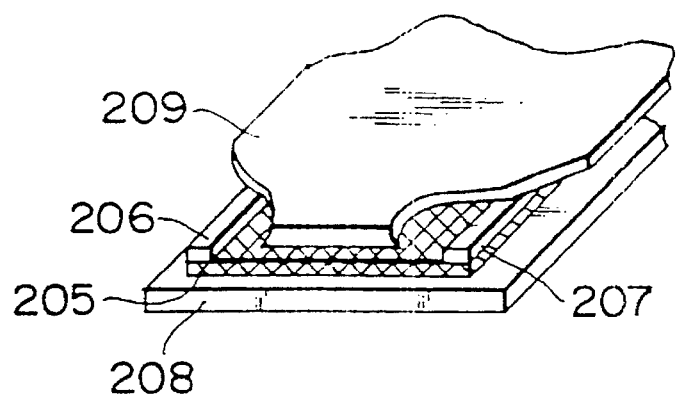
FIG. 38A is a perspective view of a conventional shield type MR head.
Figure 38B:
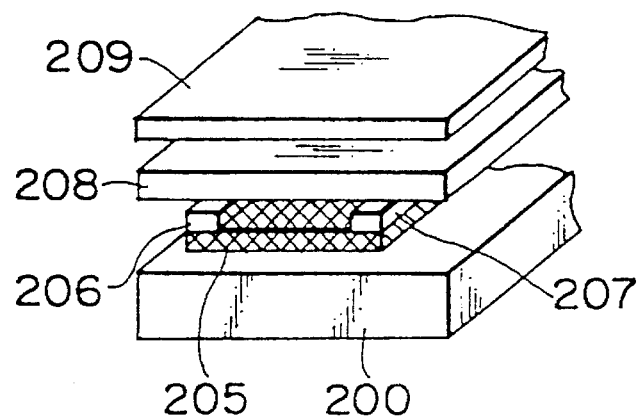
FIG. 38B is a perspective view of another conventional yoke type MR head.

Next, a description will be made of the tracking control of the head assembly 1 when data is read from a recorded track with reference with FIGS. 32 and 33. FIG. 32 illustrates peak values PA and PB of the reproduced outputs VA and VB of the reproducing heads 12A and 12B of the head assembly 1 which are detected by the peak detectors 28 and 29 and the waveform of the position signal VA–VB output from the subtracter 30 which is obtained when the head assembly 1 moves on the disk along its radial line. Since the amplitude of the reproduced outputs VA and VB of the reproducing heads 12A and 12B do not depend on recorded wavelengths, their peak values take a maximum value a when the reproducing heads are all located within the width of a data track. The amplitude of the reproduced outputs will decrease gradually as the reproducing heads shift from the data track to a unrecorded guard band. When the reproducing heads are located to extend over two data tracks as shown in FIG. 32, the amplitude of the reproduced outputs will become indefinite because of data interference between the data tracks. Supposing that the data track width is w and the guard band width is WG, the maximum value of the indefinite zone will be given by $$a \cdot (w/2 - WG) / (W/2) \qquad (3)$$

Supposing that WG=0.2W, the maximum value of the peak values PA and PB of the reproduced outputs VA and VB in the indefinite zone will be 0.6a.

By calculating PA–PB from the peak values PA and PB shown in (a) and (b) of FIG. 32, such a position signal (PA–PB) as shown in (c) of FIG. 32. The position signal (PA–PB) is zero at the center of each of the data tracks. As shown in FIG. 29, therefore, the position signal (PA–PB) output from the subtracter 30 is applied to the actuator 22 via the switch 41 and the VCM driver 42 after being subjected to the gain and phase compensation in the tracking servo compensation circuit 31. By performing feedback position control so that PA–PB=0 holds. the head assembly 1 can be placed on the center of a data track.

In order to obtain more correct position signals, each of the peak detectors 28 and 29 in FIG. 29 may be replaced with a synchronous detector. In this case, the reproduced signal from the reproducing head 12A is subjected to synchronous detection using the reproduced signal from the reproducing head 12B as a reference signal to obtain a signal SA shown in (a) of FIG. 33. Similarly, the reproduced signal from the reproducing head 12B is subjected to synchronous detection using the reproduced signal from the reproducing head 12A as a reference signal to obtain a signal SB shown in (b) of FIG. 33. The difference (SA–SB) is obtained by the subtracter 30 to produce a position signal (SA–SB) shown in (c) of FIG. 33.

Note that, in the case where the synchronous detection is used, the reference signals for the synchronous detection cannot be obtained when the reproducing heads 12A and 12B extend over two data tracks. For this reason, the position signal (SA–SB) cannot be obtained in the zones enclosed by broken lines indicated in (a), (b) and (c) of FIG. 33. Therefore, it is practically desired that the position signal (PA–PB) based on the peak detection in the arrangement of FIG. 29 and the position signal (SA–SB) based on the synchronous detection be used in combination. That is, at first coarse tracking control is performed by the use of the position signal (PA–PB) and subsequently fine tracking control is performed by the use of the position signal (SA–SB).

Next, the tracking control of the head assembly when data is rewritten on a recorded data track on which data has already been recorded in accordance with the above format will be described. With the head assembly 1 having such a construction as shown in FIGS. 26A to 26c, it is impossible for the reproducing heads 12A and 12B to reproduce signals while data is recorded. In the general disk format, data is recorded in blocks of sectors. On each sector ID information and data are recorded. Assuming that the ID information, etc., are also recorded in the present embodiment as in the disk format, data on ID information, etc., will be read from the other area than data recording area within a track even at the time of recording. Thus, a position signal (PA–PB) or (SA–SB) (i.e., a position error signal) is obtained from the other area than the data recording area within a track and the tracking control is performed on the basis of this position signal. The position signal (PA–PB) or (SA–SB) obtained immediately before the initiation of recording of data is held until recording of data is initiated. During a recording period, the signal is regarded as a position error signal, so that the same feedback position control as above is performed.

Next, the seek control of the head from a track to another track will be described with reference to FIGS. 33 and 34. In the arrangement of the disk unit shown in FIG. 29, detection of the position of the head 1 is performed by the track counter 34 which counts the number of track pulses each generated by the track pulse generator 33 every time the head crosses a track. The track pulse counter 33 may comprises a comparator which converts the position signal (PA–PB) to pulses as shown in FIG. 34.

As the comparator used as the track pulse generator 33, it is desirable to use what is referred to as a hysteresis comparator in which its threshold varies between when the input signal level increases and when the input signal level decreases. FIG. 34 illustrates a waveform when such a hysteresis comparator is used. The waveform of the track pulses shown in FIG. 34 is produced when the seek is performed from the inside to the outside of the disk 21. In this example, the threshold when the signal level varies in the positive direction is set to Vth, while the threshold when the signal level varies in the negative direction is set to zero. When the seek is performed from the inside to the outside, on the other hand, the threshold when the position signal varies in the positive direction is set to zero, while the threshold when the position signal varies in the negative direction, the threshold is set to a non-zero value. Therefore, the track pulse waveform in the case of seek from the outside to the inside of the disk is the inverse of that obtained when the seek is performed from the inside to the outside.

As can be seen from the foregoing, when a hysteresis comparator is used as the track pulse generator 33, even if the position signal level varies minutely in the neighborhood of the zero level because of noise and vibration of the head, any false track pulse will not be produced as long as the level variation is limited below the threshold Vth. As a result, an advantage arises in that no miscount of the tracks occurs.

To detect the speed of the head 1 required for seek control, the two-phase position signal X, Y from the optical position sensor 23 is used. The position signals X and Y are applied to the position signal producing circuit 37 where they are converted to such a position signal as shown in (b) of FIG. 35 according to their relationship in magnitude. The position signal is produced by extracting only linear portions of the two-phase position signal X, Y shown in (a) of FIG. 35. The position signal output from the position signal producing circuit 37 is subjected to differentiating process in the differentiator 38 to produce a speed signal. The points of discontinuity of the position signal from the position signal producing circuit 37 exhibit impulse-like waveforms because of the differentiating process. To remove this phenomenon, a smoothing process is performed by the smoother 39.

For example, when a seek instruction is issued, the head 1 is moved at a high speed from the track on which the head is positioned at present to a desired track, whereby high-speed seek is performed. To set a travel speed of the head for the high-speed seek, a speed curve providing desired speeds for intermediate tracks has been stored in the controller 35.

Next, when the head 1 starts the seek operation, the controller 35 reads a count of the track counter 34 to find the current track position and outputs data on a desired speed corresponding to the current track position. The desired speed data is converted to an analog desired speed signal by the D/A converter 36 and then applied to the subtracter 40 where the difference (speed error signal) between the desired speed signal and the actual speed signal from the smoother 39 is obtained. By feeding the speed error signal back to the actuator 22 via the switch 41 and the VCM motor 42 as a control signal, the feedback speed control loop is formed. The high-speed seek of a desired track at a high speed by the head is performed by the above procedure.

When the head comes sufficiently close to the desired track, the control system is switched from the seek control to the tracking control. Specifically, the controller 35 takes in the position signal (PA–PB) via the A/D converter 32 when the head passes through a track one track before the desired track and then observes variations of the position signal to decide whether the head has entered the area in which tracking control is possible. When it is confirmed that the area has been reached, switching is made from the seek control system to the tracking control system.

The present invention is not limited to the above embodiments. For example, to detect the position of the head, the position signal obtained from the reproduced signals from the reproducing heads 12A and 12B and the position signal output from the optical position sensor may be used in combination. It is difficult to directly detect the data track position on the basis of the position signal from the optical position sensor because of deformation of disk due to variations in temperature and humidity and aging. However, to detect the head position between track pulses obtained from the disk 21, the position signal from the optical position sensor 23 can be used. For example, the head position between tracks may be detected by counting zero cross points of the two phase position signal (X, Y) from the optical position sensor 23. It will also be possible to calculate the position of the head from analog level of the position signals X and Y.

Although, in the present embodiment, reproduced outputs of the reproducing heads 12A and 12B are subjected to signal processing (peak detection or synchronous detection) and then their difference is obtained to produce the position signal, the position signal may be obtained by detecting the difference between the reproduced outputs. Depending on conditions, the mere difference between the reproduced outputs may be defined as the position signal.

In the present embodiment, MR heads using MR films are used as the reproducing heads 12A and 12B. Instead, other types of flux sensitive heads, so-called active heads may be used which detect a signal magnetic field from a disk as high-frequency characteristics (high-frequency permeability, etc.) of a magnetic material and take out a variation of the high-frequency characteristics as a variation of an electric signal.

According to the embodiments of the magnetic disk unit of the magnetic disk system of the present invention, there is no need for areas in which servo information for positioning of a head is to be formed, thus avoiding a decrease in storage capacity due to servo information and increasing the formatting efficiency.

The position signal (position error signal) for direct tracking is continuously obtained from data tracks. Thus, there is no thermal off-track due to expansion and contraction of a disk, the trackability is improved because a high servo band is obtained and the settling characteristics and disturbance characteristics are improved. This permits accurate positioning of the head, high track density and large capacity.

Moreover, there is no need for two types of formatting as in the servo-surface and data-surface combined system. This permits quick establishment of the disk system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A magnetic disk system comprising a magnetic head and a servo control circuit for positioning the magnetic head, in which said magnetic head comprises:

a magnetic film having two ends and a magnetic resistance effect and disposed parallel to a direction of a width of a track of a magnetic recording medium;

a pair of current supplying electrodes in contact with both ends of said magnetic resistance film; and a signal detecting electrode in contact with said magnetic resistance film and disposed at such an position between said pair of current supplying electrodes that a first reproduced output between said signal detecting electrode and a first one of said pair of current supplying electrodes equals to a second reproduced output between said signal detecting electrode and a second one of said pair of current supplying electrodes when said magnetic film is centered over the track of the magnetic recording medium, and said servo control circuit comprises:

means for calculating a difference between said first reproduced output and said second reproduced output to produce a position signal of the magnetic head relative to the track; and means for controlling a position of the magnetic head based on the position signal.

2. A magnetic disk system according to claim 1, in which the position xc of said signal detecting electrode of said magnetic head satisfies:

$$\int_{-\infty}^{xc} Rs(x)dx = \int_{xc}^{+\infty} Rs(x)dx$$

where Rs(x) is a reproducing sensitivity distribution of the magnetic film and xc is a relative position of said signal detecting electrode with regard to a physical center (x=0) of the magnetic film, xc having an absolute value greater than 0.

3. A magnetic disk system according to claim 1, in which said signal detecting electrode of said magnetic head has a width narrower than a width of each of said pair of current supplying electrodes.

4. A magnetic disk system according to claim 3, in which the width of said signal detecting electrode of said magnetic head is less than ⅓ of a width of each of said pair of current supplying electrodes.

5. A magnetic disk system according to claim 1, in which said magnetic head further comprises:

an insulating film which is interposed between a first portion of said signal detecting electrode and said magnetic film, and only a second portion of said signal detecting electrode which is adjacent to said recording medium is in contact with said magnetic film.

6. A magnetic disk system comprising a magnetic head and a servo control circuit for positioning the magnetic head, in which said magnetic head comprises:

a magnetic film having two ends and magnetic resistance effect and disposed parallel to a direction of a width of a track of a magnetic recording medium;

a pair of current supplying electrodes in contact with both ends of said magnetic resistance film; and a signal detecting electrode in contact with said magnetic resistance film disposed between said pair of current supplying electrodes and said servo control circuit comprises:

means for obtaining a first reproduced output between said signal detecting electrode and a first one of said pair of current supplying electrodes;

means for obtaining a second reproduced output between said signal detecting electrode and a second one of said pair of current supplying electrodes;

means for storing a ratio of the first reproduced output to the second reproduced output when the magnetic head is on-track;

means for calculating a difference between said first reproduced output and said second reproduced output to produce a position signal of the magnetic head;

means for correcting the position signal based on the stored ratio to generate a corrected position signal; and means for controlling a position of the magnetic head based on the corrected position signal.

7. A magnetic disk system according to claim 6, which further comprises:

a magnetic recording medium having a track having a width wider than a width of the magnetic head; and means for obtaining the ratio of the first reproduced output to the second reproduced when the magnetic head is positioned at the given track.

8. A magnetic disk system according to claim 6, in which said signal detecting electrode is positioned such that the first reproduced output is equal to the second reproduced output.

9. A magnetic disk system according to claim 8, in which the position xc of said signal detecting electrode of said magnetic head is represented as follows:

$$\int_{-\infty}^{xc} Rs(x)dx = \int_{xc}^{+\infty} Rs(x)dx$$

where Rs(x) is a reproducing sensitivity distribution of the magnetic film and xc is a relative position of said signal detecting electrode with regard to a physical center (x=0) of the magnetic film.

10. A magnetic disk system according to claim 6, in which said signal detecting electrode of said magnetic head has a width narrower than a width of each of said pair of current supplying electrodes.

11. A magnetic disk system according to claim 10, in which the width of said signal detecting electrode of said magnetic head is less than ⅓ of a width of each of said pair of current supplying electrodes.

12. A magnetic disk system according to claim 6, in which said magnetic head further comprises:

an insulating film which is interposed between said signal detecting electrode and said magnetic film, and wherein only that part of said signal detecting electrode which is adjacent to said recording medium is in contact with said magnetic film.

13. A method for servo-controlling a magnetic head comprising a magnetic film having two ends and a magnetic resistance effect and disposed parallel to a direction of a width of a track of a magnetic recording medium, a pair of current supplying electrodes in contact with both ends of said magnetic resistance film, and a signal detecting electrode in contact with said magnetic resistance film and disposed between said current supplying electrodes, the method comprising the steps of:

(a) obtaining a first reproduced output between said signal detecting electrode and one of said current supplying electrodes and a second reproduced output between said signal detecting electrode and the other of said current supplying electrodes when the magnetic head is on-track;

(b) obtaining and storing a ratio of the first reproduced output to the second reproduced output when the magnetic head is on-track;

(c) obtaining a first reproduced output between said signal detecting electrode and a first one of said pair of current supplying electrodes and a second reproduced output between said signal detecting electrode and a second one of said current supplying electrodes during reproduction of the magnetic recording medium;

(d) means for calculating a difference between said first reproduced output and said second reproduced output to produce a position signal of the magnetic head;

(e) means for correcting the position signal based on the stored ratio to generate a corrected position signal; and (f) means for controlling a position of the magnetic head based on the corrected position signal.

14. A method according to claim 13, in which said step (a) comprises a substep of positioning the magnetic head at a given track of the magnetic recording medium having a width wider than a width of the magnetic head.

\* \* \* \* \*